(12) United States Patent
Srour et al.

(10) Patent No.: US 12,260,004 B2
(45) Date of Patent: Mar. 25, 2025

(54) SYSTEMS AND METHODS FOR RENDERING SECURED CONTENT ITEMS

(71) Applicant: Microsoft Technology Licensing, LLC, Redmond, WA (US)

(72) Inventors: Orr Srour, Ramat-Hasharon (IL); Vadim Makhervaks, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 396 days.

(21) Appl. No.: 17/672,394

(22) Filed: Feb. 15, 2022

(65) Prior Publication Data

US 2023/0259656 A1 Aug. 17, 2023

(51) Int. Cl.
*G06T 7/70* (2017.01)
*G06F 21/62* (2013.01)
(Continued)

(52) U.S. Cl.
CPC ......... *G06F 21/629* (2013.01); *G06K 7/1417* (2013.01); *G06T 3/40* (2013.01); *G06T 7/70* (2017.01)

(58) Field of Classification Search
CPC .... G06F 21/629; G06F 21/84; G06F 21/6209; G06K 7/1417; G06T 3/40; G06T 7/70
(Continued)

(56) References Cited

U.S. PATENT DOCUMENTS

| 9,002,727 B2 | 4/2015 | Horowitz et al. |
| 11,019,310 B1 | 5/2021 | Drako et al. |

(Continued)

FOREIGN PATENT DOCUMENTS

| CN | 104903904 B | 3/2018 |
| CN | 110050444 B | 9/2021 |

(Continued)

OTHER PUBLICATIONS

Li, et al., "Real-Time Screen-Camera Communication Behind Any Scene", In Proceedings of the 13th Annual International Conference on Mobile Systems, Applications, and Services, May 18, 2015, 15 Pages.

(Continued)

*Primary Examiner* — Shahid K Khan
*Assistant Examiner* — Ahamed I Nazar
(74) *Attorney, Agent, or Firm* — Weaver IP L.L.C.

(57) ABSTRACT

Methods, systems, apparatuses, and computer program products are provided herein for rendering secured content. For instance, a computing device may be utilized to view content that is to be displayed via a display device coupled thereto. However, rather than rendering the content, the computing device generates and/or provides a graphical representation of the content to a rendering device coupled between the computing device and the display device. The rendering device analyzes the graphical representation to determine characteristics of the graphical representation, characteristics of a display region of an application window in which the content is to be rendered, and a network address at which the actual content is located. The rendering device retrieves the content using the network address and renders the retrieved content over the display region of the application window in accordance with the characteristics determined for the graphical representation and the display region of the application window.

20 Claims, 11 Drawing Sheets

(51) Int. Cl.
*G06K 7/14* (2006.01)
*G06T 3/40* (2024.01)

(58) Field of Classification Search
USPC .......................................................... 715/716
See application file for complete search history.

(56) References Cited

U.S. PATENT DOCUMENTS

| | | | |
|---|---|---|---|
| 11,334,779 B1* | 5/2022 | Schwarzberg | G06K 19/06037 |
| 2010/0259560 A1 | 10/2010 | Jakobson et al. | |
| 2013/0263280 A1 | 10/2013 | Cote et al. | |
| 2015/0278234 A1* | 10/2015 | Masterson | G06F 16/9577 |
| | | | 715/234 |
| 2016/0036809 A1* | 2/2016 | Bhimanaik | H04L 63/102 |
| | | | 726/4 |
| 2017/0006413 A1 | 1/2017 | Kizawa et al. | |
| 2017/0303006 A1 | 10/2017 | Peng | |
| 2023/0179589 A1* | 6/2023 | Kopack | H04L 63/18 |
| | | | 726/4 |

FOREIGN PATENT DOCUMENTS

| | | |
|---|---|---|
| EP | 2107486 A2 | 10/2009 |
| EP | 2765530 A1 | 8/2014 |
| EP | 3783518 A1 | 2/2021 |
| KR | 20120040000 A | 4/2012 |

OTHER PUBLICATIONS

"International Search Report and Written Opinion Issued in PCT Application No. PCT/US22/050818", Mailed Date: Mar. 21, 2023, 10 Pages.

* cited by examiner

SYSTEMS AND METHODS FOR RENDERING SECURED CONTENT ITEMS

BACKGROUND

Data can be stored and/or viewed on a user's computer for a variety of purposes. Such purposes include, but are not limited to, viewing private or sensitive information. Users may implement security measures to protect the computers, networks, programs, or systems that maintain such data from attacks. Such attacks can take the form of malware, denial of service, theft of data, unauthorized access, tampering of data, and any number of other malicious actions.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, apparatuses, devices, and computer program products are provided herein for rendering secured content items. For instance, a computing device may be utilized to view a content item that is to be displayed via a display device coupled thereto. However, rather than rendering the content item, the computing device generates and/or provides a graphical representation of the content item to a rendering device coupled between the computing device and the display device. The rendering device analyzes the graphical representation to determine characteristics of the graphical representation, characteristics of a display region of an application window in which the content item is to be rendered, and a network address at which the actual content item is located. The rendering device retrieves the content using the network address and renders the retrieved content over the display region of the application window in accordance with the characteristics determined for the graphical representation and the display region of the application window.

Further features and advantages, as well as the structure and operation of various examples, are described in detail below with reference to the accompanying drawings. It is noted that the ideas and techniques are not limited to the specific examples described herein. Such examples are presented herein for illustrative purposes only. Additional examples will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

Figure 1:
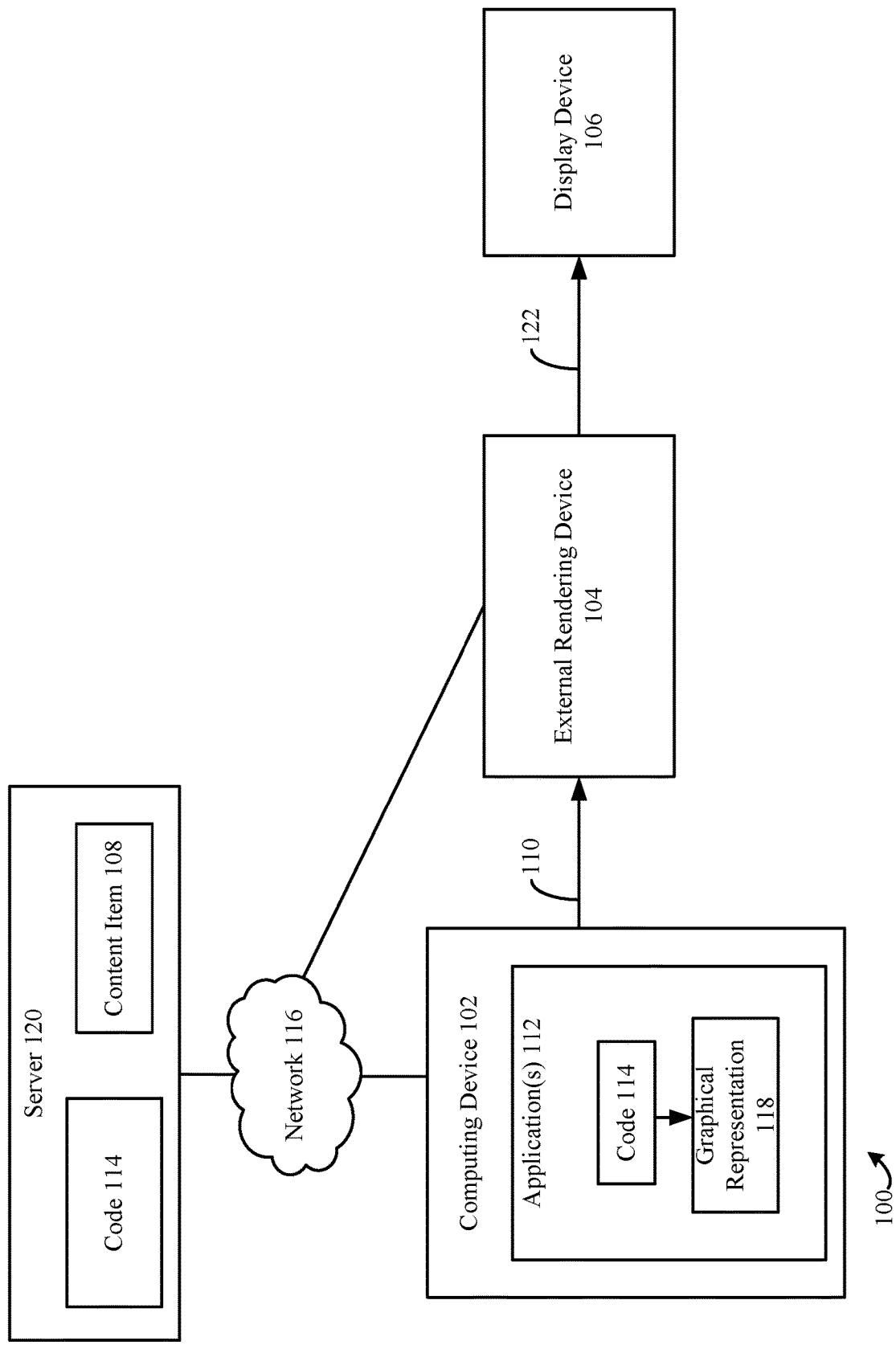
FIG. 1 is a block diagram of a system for rendering and displaying a secure content item via a rendering device externally coupled to a computing device in accordance with an example embodiment.

The features and advantages of embodiments will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description discloses numerous embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the discussion, unless otherwise stated, adjectives such as "substantially," "approximately," and "about" modifying a condition or relationship characteristic of a feature or features of an embodiment of the disclosure, are understood to mean that the condition or characteristic is defined to be within tolerances that are acceptable for operation of the embodiment for an application for which it is intended.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures and drawings described herein can be spatially arranged in any orientation or manner. Additionally, the drawings may not be provided to scale, and orientations or organization of elements of the drawings may vary in embodiments.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments for Rendering Secured Content Items

Unbeknownst to a user, malware, such as a screen scraper or a keylogger, installed on the user's computing device may acquire sensitive or confidential information maintained by the computing device. For instance, when a user accesses a banking website or another sensitive web site, the web site may display confidential information, or the user may type confidential information into specific fields to acquire access. Such information may be captured by the malware and subsequently provided to a malicious entity, which utilizes such information for nefarious purposes.

The embodiments described herein are directed to rendering secured content items. For instance, a computing device may be utilized to view a content item that is to be displayed via a display device coupled thereto. However, rather than rendering the content item, the computing device generates and/or provides a graphical representation of the content item to a rendering device coupled between the computing device and the display device. The rendering device analyzes the graphical representation to determine characteristics of the graphical representation, characteristics of a display region of an application window in which the content item is to be rendered, and a network address at which the actual content item is located. The rendering device retrieves the content using the network address and renders the retrieved content over the display region of the application window in accordance with the characteristics determined for the graphical representation and the display region of the application window.

The embodiments described herein provide improvements in other technologies, namely data security. For instance, the techniques described herein advantageously prevent secured content items from being rendered and displayed when the rendering device is not coupled to the computing device, as the secure content item is not provided to the computing device for rendering thereby. Instead, the rendering of the secure content item is performed outside of the traditional graphic pipeline; in particular, the rendering is performed by the rendering device that is coupled between the computing device and the display device. This way, if malware, such as a screen scraper, is executing on the computing device, it would not have access to the secure content item, as the secure content item is not provided to and/or rendered by the computing device. Accordingly, the techniques described herein prevent access to secured content items, such as personal and/or confidential information, unless the rendering device is utilized.

In addition, the graphical representation of the secured content item may be a quick response (QR) code, which encodes the characteristics of the graphical representation, characteristics of the display region of the application window in which the content item is to be rendered, and the network address at which the actual content item is located. Such QR codes comprise a relatively small amount of data (e.g., up to 3 Kilobytes). Accordingly, a small amount of data is required to be transmitted to the rendering device and processed by the rendering device to retrieve and render the secured content item. Accordingly, the embodiments described herein also minimize the expenditure of computing resources (e.g., input/output operations, processor cycles, memory, power, etc.) for both the computing device that provides the graphical representation of the secured content item and the rendering device that analyzes the graphical representation and retrieves and renders the secured content item.

Systems and devices may be configured in various ways for rendering and displaying secure content items. For instance, FIG. 1 is a block diagram of a system 100 for rendering and displaying a secure content item via a rendering device externally coupled to a computing device in accordance with an example embodiment. As shown in FIG. 1, system 100 comprises a computing device 102, an external rendering device 104, a display device 106, and a server 120. Computing device 102 is configured to execute one or more applications 112. Application(s) 112 may be configured to access and/or open content items (e.g., content 108) via a network 116. Examples of content items include, but are not limited to, a document, a spreadsheet, a web page, an image, a video, and other forms of content (e.g., an application window and/or user interface elements in an embodiment in which a remote or virtual desktop is being provided via server 120). Content item 108 may be hosted on server 120 (e.g., a web server, a data server, etc.) and/or provided via a web application executing on server 120. Examples of application(s) 112 include, but are not limited, a browser application (e.g., Microsoft Edge®, published by Microsoft Corp. of Redmond, Washington, Mozilla Firefox®, published by Mozilla Corp. of Mountain View, California, Safari®, published by Apple Inc. of Cupertino, California, and Google® Chrome, published by Google Inc. of Mountain View, California), a word processing application (e.g., Microsoft Word® published by Microsoft® Corp.), a spreadsheet application (e.g., Microsoft Excel® published by Microsoft® Corp.), a presentation application (e.g., Microsoft PowerPoint® published by Microsoft® Corp.), etc. Network 116 may comprise one or more networks such as local area networks (LANs), wide area networks (WANs), enterprise networks, the Internet, etc., and may include one or more of wired and/or wireless portions.

Content (e.g., content item 108) (either retrieved via network 116 or content local to computing device 102) is rendered by a processor or graphical processing unit (GPU) of computing device 102 and typically provided to a display device (e.g., display device 106) coupled to computing device 104. Display device 106 and computing device 102 may be communicatively coupled via a communication interface, such as, but not limited to, an HDMI (High-Definition Multimedia Interface) interface, a USB (Universal Serial Bus) interface, a PCIe (Peripheral Component Interconnect Express) interface, a I2C (Inter-Integrated Circuit) interface, a DVI (Digital Video Interface), a DisplayPort interface, an embedded DisplayPort (eDP) interface, etc. Computing device 102 is configured to provide content for display by display device 106 via a video signal 110, which is transmitted via such communication interface(s).

Computing device 102 may be any type of computing device or computing system, including, a personal computer, a laptop computer, a tablet device, a smart phone, a game console or gaming device, and/or the like that are configurable to output a video signal to a display device, such as display device 106. Examples of display device 106, include, but are not limited to, a monitor, a projector, a television, etc.

In certain scenarios, one may desire for content item 108 to be viewed by certain individuals and/or organizations. In such scenarios, content item 108 is made viewable via external rendering device 104. As shown in FIG. 1, external rendering device 104 is configured to be communicatively coupled to both computing device 102 and display device 106. External rendering device 104 may act as an intermediary (or bridge) between computing device 102 and display device 106. External rendering device 104 is external to computing device 102 (e.g., external rendering device 104 is not incorporated within computing device 102). External rendering device 104 may also be external to display device 106. Alternatively, one or more components of external rendering device 104 (as described herein) may be incorporated within display device 106. In accordance with an embodiment, external rendering device 104 is a docking station to which computing device 102 (e.g., a laptop) may be attached. The docking station serves as a base station for a laptop, which comprises a plurality of input and/or output ports to which input and/or output peripheral devices may be attached. Examples of docking stations, include, but are not limited to, an expansion dock, a port replicator or hub, a breakout dock (or multi-port adaptor), etc. In accordance with another embodiment, external rendering device is a standalone (or custom) device that is configured to implement the techniques described herein.

When an application of application(s) 112 provide a request to server 120 for content item 108, server 120 may instead provide code 114. Application(s) 112 are configured to execute code 114. Examples of code 114 include, but are not limited to JavaScript, TypeScript, etc. When code 114 is executed, a graphical representation 118 of content item 108 is rendered in an application window of the application of application(s) 112 that requested content item 108. Graphical representation 118 may utilize an encoding to specify a network address (e.g., a uniform resource identifier (URI) or uniform resource locator (URL)) at which content item 108 may be retrieved. The encoding may also specify various characteristics of graphical representation 118 itself. For instance, the encoding may specify one or more dimensions of graphical representation 118 (the height and/or width of graphical representation 118 in pixel values (e.g., 150 pixels by 150 pixels), an offset value representative of an offset of graphical representation in pixel values (e.g., 50 pixels by 50 pixels) from an origin coordinate of a display region (e.g., the top left pixel or coordinate (0,0)) of the application window in which graphical representation 118 is to be displayed). The encoding may further specify characteristics of the application window of application 112 in which graphical representation 118 is included. For example, the encoding may specify dimensions of the display region of the application (e.g., the height and/or width of the display region in pixel values).

Code 114 may be configured to dynamically generate a new graphical representation 118 each time the application window resized. The new graphical representation 118 comprises an encoding that reflects the dimensions of the resized application window. For instance, code 114 may be configured to detect one or more events issued by an operating system executing on computing device 102 and/or application(s) 114 when the application window is resized. In an embodiment in which code 114 comprises JavaScript, the foregoing may be achieved by utilizing the addEventListener method (e.g., window.addEventListener("resize," displayWindowSize). In accordance with an embodiment, graphical representation 118 is a quick response (QR) code (e.g., a real time and responsive QR code).

External rendering device 104 is configured to receive video signal 110 (e.g., via one of the aforementioned communication interfaces). External rendering device 104 is configured to analyze video signal 110 to detect graphical representation 118. Upon detecting graphical representation 118, external rendering device 104 analyzes the encoding of graphical representation 118 to determine the network address, the characteristics of graphical representation 118, and/or the characteristics of the application window in which graphical representation 118 is included.

External rendering device 104 is configured to access and/or retrieve content item 108 via network 116 in accordance with the network address specified by the encoding of graphical representation 118 and render content item 108 for display by display device 106. For instance, external rendering device 104 may render content item 108 such that it is placed in the application window in which graphical representation 118 is displayed. Content item 108 is rendered based on the characteristics (e.g., dimensions) determined for the application window and/or the characteristics (e.g., dimensions) determined for graphical representation 118. For instance, server 120 may scale content item 108 in accordance with the video characteristics (e.g., the video resolution and/or aspect ratio) utilized by computing device 102. External rendering device 204, however, may have different video characteristics. To ensure that content item 108 is rendered properly, external rendering device 104 may scale content item 108 to synchronize the video resolution of the incoming video signal (i.e., video signal 110) and the video resolution utilized by external rendering device 104 utilizing the characteristics of the application window and the characteristics of graphical representation 118. This advantageously causes content item 108 to not appear skewed or distorted when displayed by display device 106. External rendering device 104 generates a video signal 122, which comprises the video data provided via video signal 110, as well as the video data corresponding to content item 108. Video signal 122 is provided to display device 106, which displays content item 108 rendered by external rendering device 104 over the application window of the application of application(s) 112 that requested content item 108.

As shown in FIG. 1 and described below with reference to FIG. 2, external rendering device 104 may comprise a network interface via which external rendering device 104 communicates via network 116. However, it is noted that the embodiments described herein are not so limited. For instance, external rendering device 104 may utilize the network connection established between computing device 102 and server 120 to retrieve content item 108. In such an example, external rendering device 104 may provide a request for content 108 to computing device 102 and computing device 102 may retrieve content item 108 on behalf of external rendering device 104.

It is also noted that the embodiments described herein are not limited to rendering and displaying secure content items associated with remote applications (e.g., via server 120). For instance, secure content items may be associated with application(s) (e.g., application(s) 112) or process(es) executing on computing device 102. In accordance with such embodiments, code 114 originates from such application(s) or process(es) (rather than server 120). Computing device 102 provides graphical representation 118 to external rendering device 104, as described above, and external rendering device 104 determines a location (e.g., a network address) at which the secure content item is located based on the encoding of graphical representation 118. The secure content item may be stored on a remote server or on computing device 102. In the latter case, the location specified by the encoding may specify a network address of computing device 102, and external rendering device 104 may retrieve the secure content item from computing device 102 via a network interface of external rendering device 104 and network 116.

In accordance with the foregoing techniques, only individuals and/or organizations that utilize external rendering device 104, which is configured to detect and analyze graphical representation 120 and render content item 108 outside of the traditional graphic pipeline, are able to view content item 108. For instance, server 120 may be configured to authenticate external rendering device 104 before providing content item 108. For example, when establishing a connection with server 120 and/or providing a request for content item 108, external rendering device 104 may provide an attestation key to server 120, which server 120 utilizes to verify whether external rendering device 120 is authorized to communicate with server 120 and/or authorized to receive content item 120. If server 120 determines that external rendering device 120 is authorized, server 120 provides content item 108 responsive to receiving a request therefor from external rendering device 104. If server 120 determines that external rendering device 120 is not authorized, then server 120 does not provide content 108 to external rendering device 104. This advantageously enables only approved external rendering devices (e.g., external rendering device 104) to retrieve secured content items (e.g., content item 108).

Figure 2:
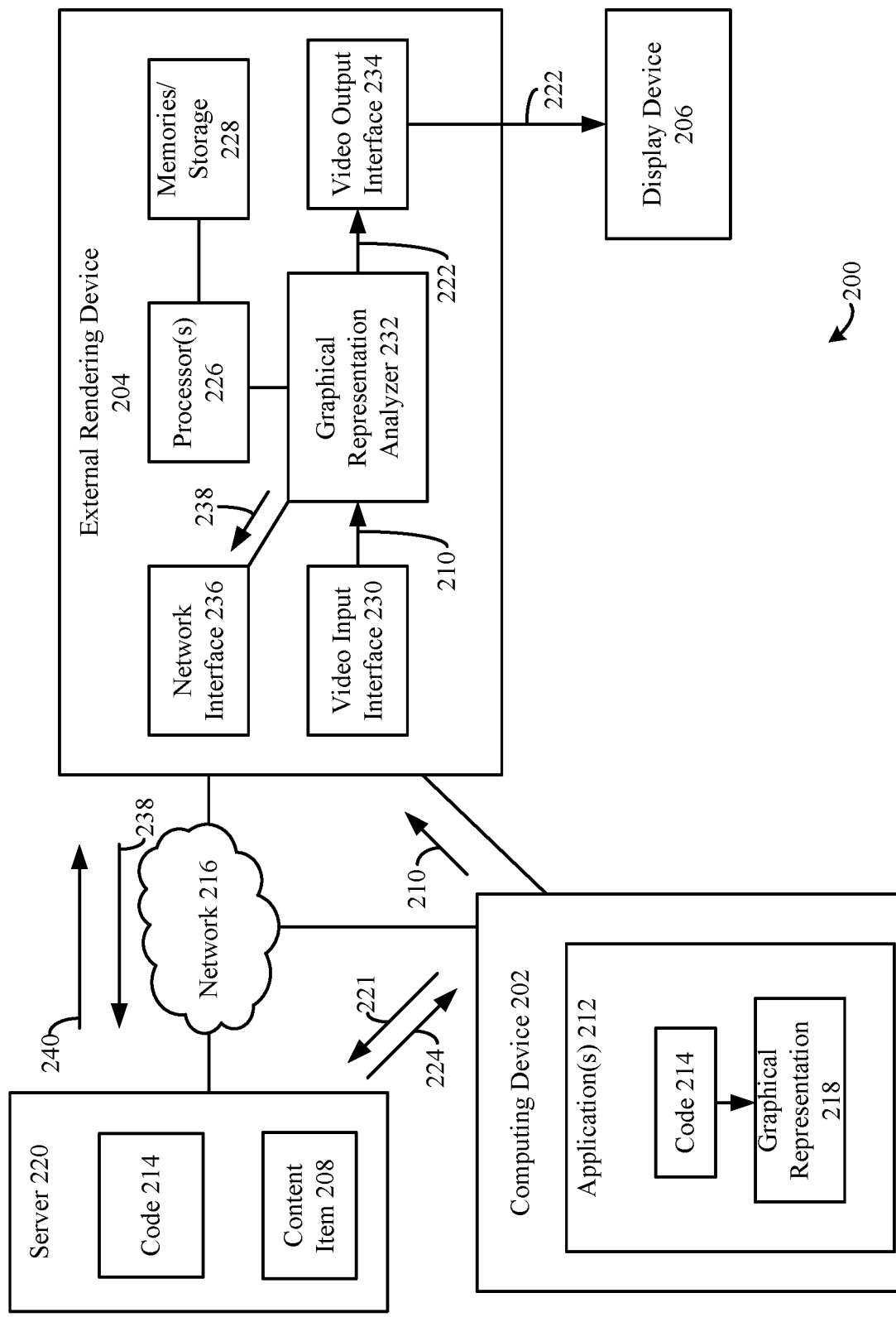
FIG. 2 depicts a block diagram of a system configured to render and display a secure content item via a rendering device externally coupled to a computing device in accordance with another example embodiment.

FIG. 2 depicts a block diagram of a system 200 configured to render and display a secure content item via a rendering device externally coupled to a computing device in accordance with another example embodiment. As shown in FIG. 2, system 200 comprises a computing device 202, an external rendering device 204, a display device 206, and a server 220. Computing device 202, external rendering device 204, display device 206, and server 220 are examples of computing device 102, external rendering device 104, a display device 106, and server 120, as described above with reference to FIG. 1. Computing device 202 and external rendering device 204 are communicatively coupled to server 220 via network 216, which is an example of network 116, as described above with reference to FIG. 1.

As further shown in FIG. 2, computing device 202 comprises application(s) 212, which are examples of application(s) 112, as described above with reference to FIG. 1. An application of application(s) 212 may issue a request 221 for a content item 208 hosted by server 220. Content item 208 is an example of content item 108, as described above with reference to FIG. 1. Request 221 may be an HTTP (hypertext transfer protocol)-based message, such as an HTTP GET request, a Remote Desktop Protocol (RDP)-based request, an RDP over HTTP Secure (HTTPS)-based request, or other network-based or remote desktop-based protocol requests. In response to receiving request 221, server 220 provides code 214 rather than content item 208 via a response 224, such as an HTTP-based response, an RDP-based response, an RDP over HTTPS-based response, etc. Code 214 is an example of code 114, as described above with reference to FIG. 1.

The requesting application is configured to execute code 214. Execution of code 214 results in a graphical representation 218 of content item 208, which is rendered by computing device 202 (e.g., a processor or GPU of computing device 202). Graphical representation 218 may be rendered in an application window of the requesting application.

Computing device 202 provides graphical representation 218 (and other content being rendered by computing device 202, e.g., a desktop of an operating system, other application windows, user interface elements, etc.) via a video signal 210. For instance, computing device 202 may comprise a video output interface by which video signal 210 is transmitted. Examples of a video output interfaces include, but are not limited to an HDMI port, a DVI port, USB port, an I2C port, PCIe port, a DP port, an eDP port, etc. A device comprising a corresponding video input interface (e.g., an HDMI port, a DVI port, USB port, an I2C port, PCIe port, a DP port, an eDP port, etc.) is configured to receive, process and display video signal 210.

Figure 3A:
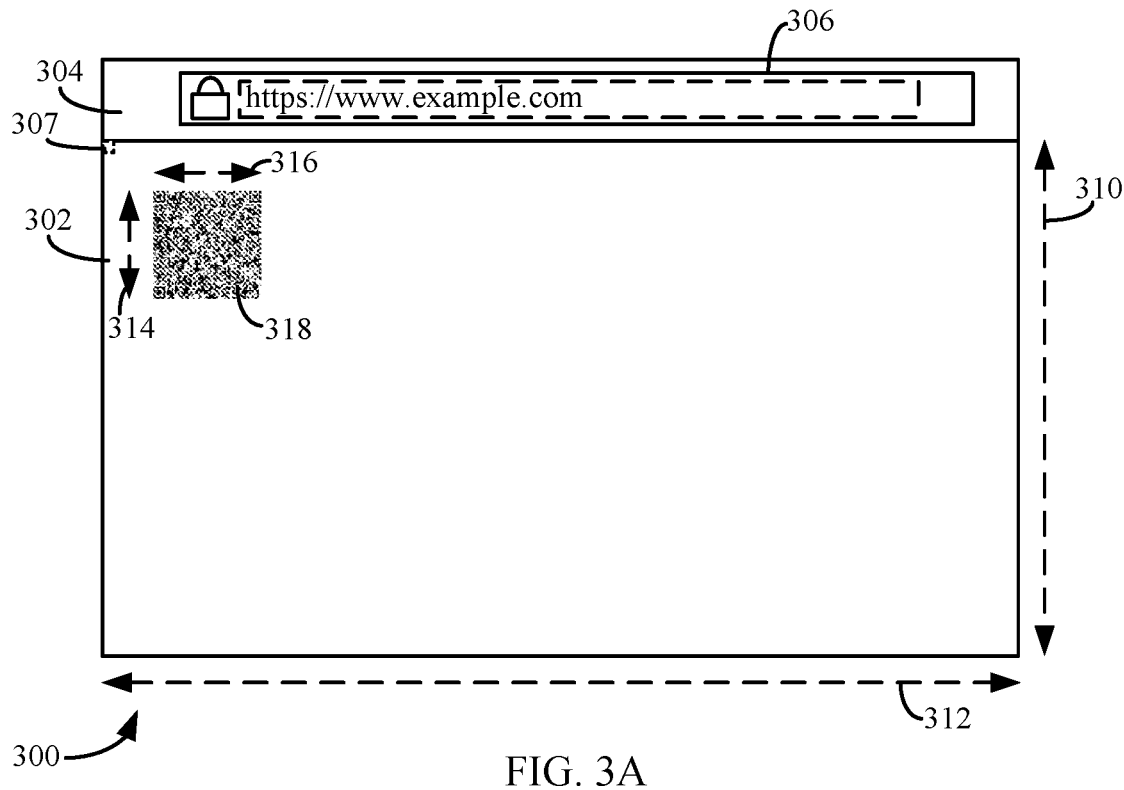
FIGS. 3A and 3B shows example application windows in accordance with example embodiments.

For example, FIG. 3A depicts an example application window 300 in accordance with an example embodiment. In the example shown in FIG. 3A, the application requesting content item 208 is a browser application. Accordingly, application window 300 is a browser application window. However, it is noted that other types of applications may request for content item 208.

As shown in FIG. 3A, application window 300 comprises a user interface 304 and a display region 302 in which various content is rendered and displayed (e.g., web pages, documents, images, videos, content item 208, an application window and/or user interface elements (e.g., in an embodiment in which a remote or virtual desktop is being provided via server 120), graphical representation 218). User interface 304 is a graphical user interface (GUI) that comprises a plurality of user interface elements. Examples of such user interface elements include, but are not limited to, an address bar 306 for specifying a network address to which the browser application is to navigate (e.g., a network address associated with server 220) and to display the network address of a current web page navigated to by the browser application, a back button and a forward button, which enable a user to navigate to different network addresses stored in a browser history maintained by the browser application in a backward and forward manner, respectively, a refresh button, which reloads or ("refreshes") the web page displayed in application window 300, etc.

As further shown in FIG. 3A, a graphical representation 318 is rendered and displayed in display 302 of application window 300. Graphical representation 318 is an example of graphical representation 218, as described above with reference to FIG. 2. In the example shown in FIG. 3A, graphical representation 318 is a QR code. Such QR codes comprise a relatively small amount of data (e.g., up to 3 Kilobytes). Accordingly, a small amount of data is required to be transmitted to external rendering device 204 and processed by external rendering device 204 to retrieve and render content item 208. Accordingly, the embodiments described herein minimize the expenditure of computing resources (e.g., input/output operations, processor cycles, memory, power, etc.) for both computing device 202 that provides graphical representation 218 and external rendering device 204 that analyzes graphical representation 218 and retrieves and renders content item 208. It is noted that other types of graphical representations in addition to and/or in lieu of QR codes may be utilized.

Graphical representation 318 utilizes an encoding to specify a network address at which content item 208 may be retrieved. The encoding may also specify various characteristics of graphical representation 318 itself. For instance, the encoding may specify one or more dimensions of graphical representation 118 (the height and/or width of graphical representation 218 in pixel values (e.g., 150 pixels by 150 pixels), an offset value representative of an offset of graphical representation in pixel values (e.g., 50 pixels by 50 pixels) from a coordinate of a display region (e.g., an origin coordinate 307 representative of the top left pixel of display region 302 (i.e., coordinate (0,0)). The encoding may further specify characteristics of application window 300. For example, the encoding may specify a first dimension value representative of a first dimension 310 (e.g., the height) of display region 302 of application window 300 and a second dimension value representative of a second dimension 312 (e.g., the width) of display region 302 of application window 300.

Graphical representation 318 is displayed to a user via application 300 when external rendering device 304 is not being utilized or before external rendering device 304 has analyzed the contents of graphical representation 218 and/or retrieved and rendered the associated content item (e.g., content item 208). As described below with reference to FIGS. 9-11C, graphical representation 318 may be displayed when application window 300 is inactive.

Referring again to FIG. 2, external rendering device 204 may include one or more of processors 226, one or more of a memory and/or other physical storage device ("memory") 228, a network interface 236, a video input interface 230, a video output interface 234, and a graphical representation analyzer 232. External rendering device 204 may also include additional components (not shown for brevity and illustrative clarity) including, but not limited to, components and subcomponents of other devices and/or systems herein, as well as those described below with respect to FIGS. 12 and 13.

Processor(s) 226 and memory 228 may respectively be any type of processor circuit and memory that is described herein, and/or as would be understood by a person of skill in the relevant art(s) having the benefit of this disclosure. Processor(s) 226 and memory 228 may each respectively comprise one or more processors or memories, different types of processors or memories, remote processors or memories, and/or distributed processors or memories. Processor(s) 226 comprise circuitry that is configured to execute computer program instructions such as but not limited to embodiments of graphical representation analyzer 232, which may be implemented as computer program instructions for rendering secured content items, etc., as described herein. In other embodiments, graphical representation analyzer 232 may be implemented by circuitry of processor(s) 226 or another circuit communicatively coupled to processor(s) 226. Memory 228 is configured to store such computer program instructions/code, as well as to store other information and data described in this disclosure including, without limitation, characteristics of content item 208, characteristics of the application window in which content item 208 is to be displayed, frame buffers, etc. In still other embodiments, external rendering device 204 may be implemented as a thin client configured with a simple or low-performance processor and network connectivity. In accordance with such embodiments, external rendering device 204 establishes a network connection (e.g., via network interface 236) with a remote server that is configured to perform the operations of graphical representation analyzer 232, as described herein.

Video input interface 230 may comprise hardware and/or software and is configured to receive video signals from any number and/or types of source devices (e.g., computing device 202) configured to output video signals. For example, video input interface 230 may comprise one or more ports configured to receive a video cable utilized for transmission of video signals. In a particular example, the video cable couples external rendering device 204 to computing device 202. Examples of port(s) include, but are not limited to, HDMI ports, USB ports, PCIe ports, I2C ports, DVI ports, DP ports, eDP ports, etc. Examples of video cables include, but are not limited to, HDMI cables, USB cables, PCIe cables, I2C cables, DVI cables, DP cables, eDP cables, etc.

Video output interface 234 may comprise hardware and/or software and is configured to output video signals to any number and/or types of sink devices (e.g., display device 206) configured to display video signals. For example, video output interface 234 may comprise one or more ports configured to receive a video cable utilized for transmission of video signals. In a particular example, the video cable couples external rendering device 204 to display device 206. Examples of port(s) include, but are not limited to, HDMI ports, USB ports, PCIe ports, I2C ports, DVI ports, DP ports, eDP ports, etc. Examples of video cables include, but are not limited to, HDMI cables, USB cables, PCIe cables, I2C cables, DVI cables, DP cables, eDP cables, etc.

Network interface 236 may be any type or number of wired and/or wireless network adapter, modem, etc., configured to enable external rendering device 204 to communicate with other devices (such as server 220) over network 216.

Video input interface 230 is configured to receive video signal 210 and provide video signal 210 to graphical representation analyzer 232. Graphical representation analyzer 232 is configured to analyze video signal 210 to detect graphical representation 218 included therein. For instance, the encoding of graphical representation 218 may comprise an identifier that indicates that graphical representation 218 is intended for external rendering device 204. The identifier may specify an alpha and/or numeric identifier that is specifically associated with external rendering device 204. Graphical representation analyzer 232 may compare the identifier to an identifier maintained locally, for example, in memory 228. Upon determining that the identifiers match, graphical representation analyzer 232 determines that graphical representation 218 included in video signal 218 is to be further analyzed and rendered by external rendering device 204. If the identifiers do not match or no such an identifier is included, then graphical representation analyzer 232 acts as a pass-through and provides video signal 210 to video output interface 234, which outputs video signal 210 to display device 206 for display thereby.

Upon determining that the identifier that is encoded in graphical representation 218 matches the identifier maintained by external rendering device 204, graphical representation analyzer 232 further analyzes the encoding of graphical representation 218 to determine the network address at which content item 208 is located, the characteristics of graphical representation 218, and/or the characteristics of the application window (e.g., application window 300, as shown in FIG. 3A) in which graphical representation 218 is included.

Graphical representation analyzer 232 is configured to retrieve content item 208 via network interface 236 and network 216. For instance, graphical representation analyzer 232 may issue a request 238 for content item 208. Request 238 may be an HTTP-based message, such as an HTTP GET request, an RDP-based request, an RDP over HTTPS-based request, etc. Network interface 236 is configured to provide request 238 to a server specified by the network address included in the encoding of graphical representation 218. In the example shown in FIG. 2, the server is server 220; however, content item 208 may be maintained by a server other than server 220. Server 220 returns a response 240, such as an HTTP-based response, an RDP-based response, an RDP over HTTPS-based response, etc., comprising content item 208 via network 216. Network interface 236 is configured to receive response 240. Graphical representation analyzer 232 may be configured to analyze response 240 and obtain content item 208 from response 240.

Graphical representation analyzer 232 is also configured to determine a scaling factor, which is utilized to synchronize the video resolution utilized by computing device 202 and the video resolution utilized by external rendering device 204. This advantageously causes content item 208 to not appear skewed or distorted when displayed by display device 106. To determine the scaling factor, graphical representation analyzer 232 determines one or more dimensions of graphical representation 218 (the height and/or width) of graphical representation 218 in pixel values as would be displayed in the display region of the application window by display device 206. Note that these dimensions are not the same dimensions that are encoded in graphical representation 218 (although the values of such dimensions may be the same in certain scenarios, for example, when the video resolutions of external rendering device 204 and computing device 202 match). Instead, these dimensions are determined based on an analysis of the data transmitted via video signal 210. For instance, the data transmitted via video signal 210 may be stored via a frame buffer (also referred herein as the main frame buffer) rendered by computing device 202 and maintained by external rendering device 204, e.g., stored in memory 228. The frame buffer comprises data that describes all the visual elements that will appear on display device 206, such as menus, application windows, images, videos, etc. For example, the frame buffer comprises a bitmap comprising pixel values for all the pixels that drive display device 206. Graphical representation analyzer 232 may be configured to reconstruct and/or analyze the frame buffer to determine the dimensions of graphical representation 218, as would be displayed via display device 206. For example, with reference to FIG. 3A, graphical representation analyzer 232 may determine a first dimension value representative of a first dimension 314 (e.g., the height) of graphical representation 318 and a second dimension value representative of a second dimension 316 (e.g., the width) of graphical representation 318.

Referring again to FIG. 2, graphical representation analyzer 232 determines the scaling factor based on at least one of the dimensions of graphical representation 318 that is encoded therein and at least one of the dimensions of graphical representation 318 determined via analysis of the frame buffer (i.e., the dimensions(s) of graphical representation 318 as would be displayed via display device 206). In accordance with an embodiment, the scaling factor may be determined in by dividing the width value (e.g., dimension 316, as shown in FIG. 3A) of graphical representation 218 as would be displayed by display device 206 by the width value of graphical representation 218 that is encoded thereby. In accordance with another embodiment, the scaling factor may be determined in by dividing the height value (e.g., dimension 314, as shown in FIG. 3A) of graphical representation 218 as would be displayed by display device 206 by the height value of graphical representation 218 that is encoded thereby. It is noted that in embodiments in which graphical representation 218 comprises a square shape, the respective height and width values are the same value. In such embodiments, the encoding of graphical representation 218 may specify a single dimension value, as both the height and width values are the same.

Graphical representation analyzer 232 then utilizes the scaling factor to determine the dimensions of content item 208 to be displayed by display device 206. For instance, graphical representation analyzer 232 may scale the dimension(s) of the display region (e.g., display region 302, as shown in FIG. 3A) of the application window (e.g., application window 300, as shown in FIG. 3A) in which content item 208 is to be displayed based on scaling factor. In accordance with one embodiment, graphical representation analyzer 232 may multiply the scaling factor by a first dimension determined for the display region (e.g., width 312, as shown in FIG. 3A) to determine a corresponding dimension (i.e., width) for content item 208, and graphical representation analyzer 232 may multiply the scaling factor by a second dimension determined for the display region (e.g., height 310, as shown in FIG. 3A) to determine a corresponding dimension (i.e., height) for content item 208.

To determine the location at which content item 208 should be displayed, graphical representation analyzer 232 analyzes the frame buffer to determine the origin coordinate of the display region in which content item 208 is to be displayed (e.g., origin coordinate 307, as shown in FIG. 3A). To determine the origin coordinate, graphical representation analyzer 232 may analyze the frame buffer to determine a particular coordinate at which graphical representation 218 is located with respect to the entire image (or view) displayed by display device 206. For instance, graphical representation analyzer 232 may determine the coordinate at which the top left corner of graphical representation 218 is located (it is noted that any corner of graphical representation 218 may be utilized). Graphical representation analyzer 232 may then subtract the offset value (as determined from the encoding of graphical representation 218) from the coordinate at which the top left corner of graphical representation 218 is located. The resulting value corresponds to the origin coordinate of the display region of the application window. Graphical representation analyzer 232 then scales the x and y coordinates of the determined origin coordinate based on the scaling factor. For instance, graphical representation analyzer 232 may multiply the x coordinate and they coordinate of the determined origin coordinate by the scaling factor to determine the corresponding x and y coordinates at which the top left of content item 208 is to be displayed.

Utilizing the scaled x and y coordinates and the scaled dimensions, graphical representation analyzer 232 renders content item 208 into another frame buffer, which corresponds to the location and size of the display region of the application window in which content item 208 is to be displayed. This frame buffer comprises a bitmap comprising pixel values for all the pixels corresponding to the scaled content item 208. Graphical representation analyzer 232 overlays the frame buffer comprising the scaled content item 208 on top of a portion of the main frame buffer corresponding to the display region of the application window in which the scaled content item 208 is to be displayed by display device 206. Graphical representation analyzer 232 renders the frame buffer comprising the scaled content item 208 and outputs a video signal 222 comprising the content rendered by computing device 202 and the scaled content item 208. Video signal 222 is an example of video signal 122, as described above with reference to FIG. 1. Video signal 222 is provided to display device 206 for display thereby via video output interface 234.

In accordance with an embodiment, graphical representation analyzer 232 may replace the pixel values of the pixels that comprise the display region of the application window with the pixel values of the pixels that comprise the scaled content item 208. Graphical representation analyzer 232 may convert the resulting bitmap to video signal 222.

The foregoing techniques cause the scaled content item 208 to be displayed over the display region of the application window, thereby causing the scaled content item 208 to be appear as if it is actually rendered within the application window by computing device 202, even though it was rendered by external rendering device 204. The foregoing techniques advantageously enables a seamless integration of the content rendered by external rendering device 204 and the content rendered by computing device 202.

Figure 3B:
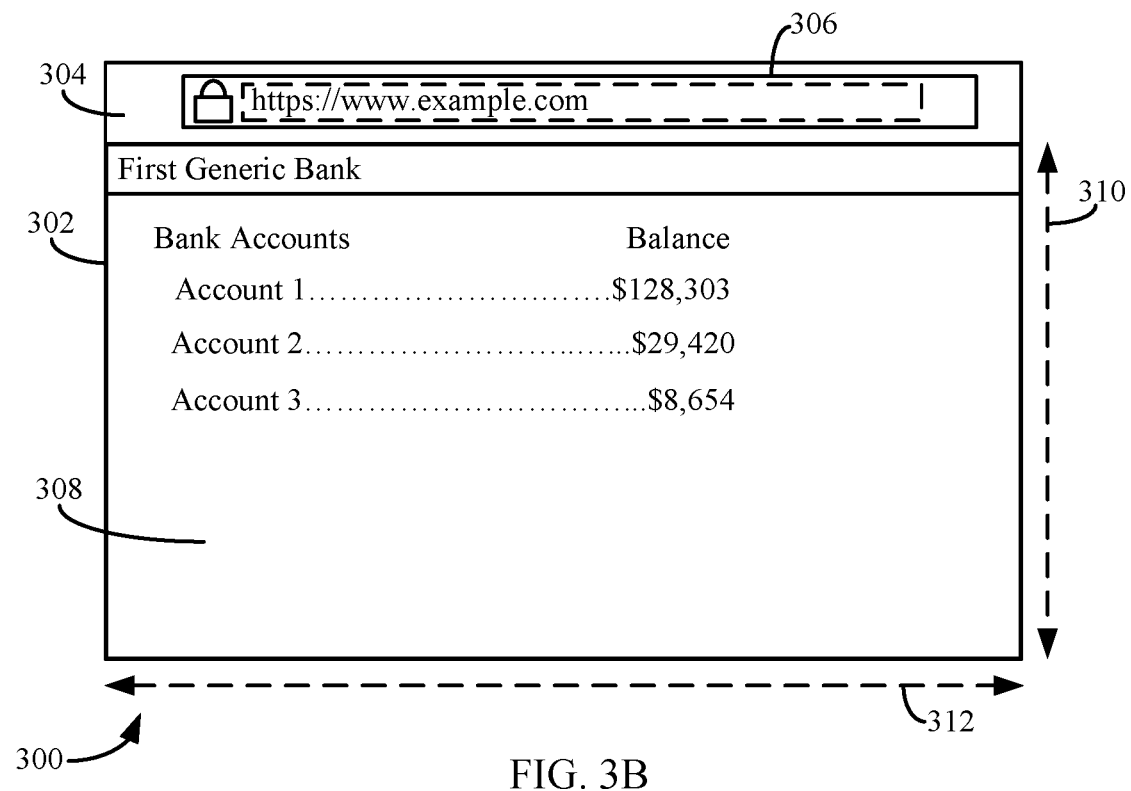

For example, FIG. 3B depicts application window 300 after a secured content item has been rendered by external rendering device 204 in accordance with an example embodiment. As shown in FIG. 3B, secured content item 308 is displayed in display region 302 of application window 300. Content item 308 is an example of content item 208, as described above with reference to FIG. 3. In the example shown in FIG. 3B, a browser application has navigated to a banking website, and content item 308 is a website comprising a user's personal banking information made available via the banking website. As further shown in FIG. 3B, content item 308 appears to be rendered by computing device 202 (as described above with reference to FIG. 2) and displayed within display region 302 of application window 300 when in fact it was rendered by external rendering device 204 (as described above with reference to FIG. 2) and displayed over display region 302.

Figure 4:
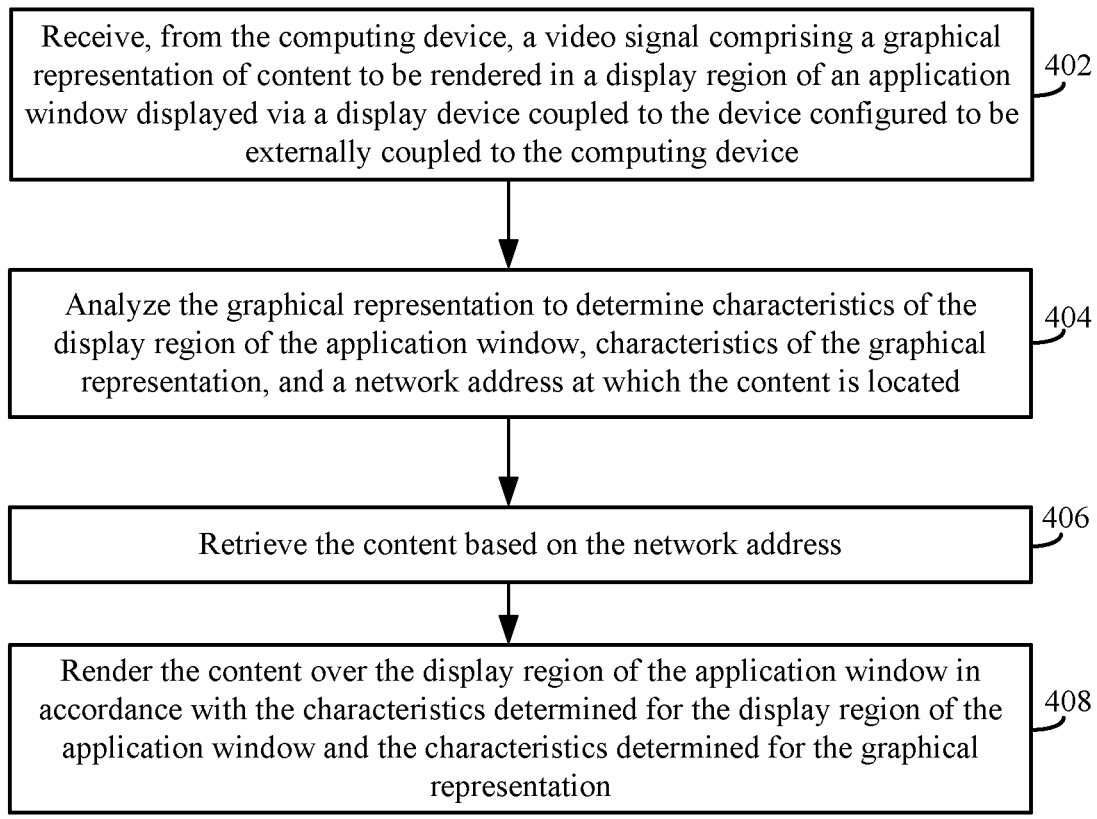
FIG. 4 shows a flowchart for rendering, by a device configured to be externally coupled to a computing device, a secured content item in accordance with an example embodiment.

Accordingly, secured content items may be rendered and displayed in many ways. For instance, FIG. 4 shows a flowchart 400 for rendering, by a device configured to be externally coupled to a computing device, a secured content item in accordance with an example embodiment. In an embodiment, flowchart 400 may be implemented by external rendering device 204, as described above with reference to FIG. 2, although the method is not limited to that implementation. Accordingly, FIG. 4 will be described with continued reference to FIG. 2. Other structural and operational embodiments will be apparent to persons skilled in the relevant art(s) based on the discussion regarding flowchart 400 and external rendering device 204 of FIG. 2.

Flowchart 400 begins at step 402. In step 402, a video signal comprising a graphical representation of content to be rendered in a display region of an application window displayed via a display device coupled to the device configured to be externally coupled to the computing device is received from the computing device. For example, with reference to FIG. 2, video input interface 230 of external rendering device receives video signal 210 from computing device 202. Video signal 210 comprises graphical representation 218, which is to be rendered in a display region (e.g., display region 302, as shown in FIG. 3A) of an application window (e.g., application window 300, as shown in FIG. 3A) displayed via display device 206.

In accordance with one or more embodiments, the device configured to be externally coupled to the computing device is a docking station. For example, with reference to FIG. 2, external rendering device 204 may be a docking station.

In accordance with one or more embodiments, the device configured to be externally coupled to the computing device is incorporated into the display device. For example, with reference to FIG. 2, external rendering device 204 may be incorporated into display device 206.

In accordance with one or more embodiments, the graphical representation is a QR code. For example, with reference to FIG. 2, graphical representation 218 may be a QR code. As described above, QR codes comprise a relatively small amount of data (e.g., up to 3 Kilobytes). Accordingly, a small amount of data is required to be transmitted to external rendering device 204 and processed by external rendering device 204 to retrieve and render content item 208. Accordingly, the embodiments described herein also minimize the expenditure of computing resources (e.g., input/output operations, processor cycles, memory, power, etc.) for both computing device 202 that provides graphical representation 218 and external rendering device 204 that analyzes graphical representation 218 and retrieves and renders content item 208.

In step 404, the graphical representation is analyzed to determine characteristics of the display region of the application window, characteristics of the graphical representation, and a network address at which the content is located. For example, with reference to FIG. 2, video input interface 230 provides video signal 210 to graphical representation analyzer 232, which is configured to analyze graphical representation 218 included in video signal 210 to determine characteristics of the display region (e.g., display region 302, as shown in FIG. 3A) of the application window (e.g., application window 300, as shown in FIG. 3A), characteristics of graphical representation 218, and a network address at which the content (e.g., content item 208) is located.

In accordance with one or more embodiments, the characteristics of the display region of the application window comprise at least one of a first dimension value representative of a first dimension of the display region of the application window or a second dimension value representative of a second dimension of the display region of the application window, and the characteristics of the graphical representation comprise at least one of an offset value representative of an offset of the graphical representation from a first origin coordinate of the display region of the application window, a third dimension value representative of a third dimension of the graphical representation, or a fourth dimension value representative of a fourth of the graphical representation. For example, with reference to FIG. 3A, the characteristics of display region 302 of application window 300 comprise at least one of a first dimension value representative of a first dimension 310 (e.g., the height) of display region 302 of application window 300 or a second dimension value representative of a second dimension 312 (e.g., the width) of display region 302 of application window 300, and the characteristics of graphical representation 318 comprise at least one of an offset value representative of an offset of graphical representation 318 from a first origin coordinate (e.g., coordinate 308) of display region 302 of application window 300, a third dimension value representative of a third dimension (e.g., the height) of graphical representation, or a fourth dimension value representative of a fourth dimension (e.g., the width) of graphical representation 318. As described below with reference to FIG. 7, the first dimension value and the second dimension value may be scaled in accordance with a scaling factor to synchronize the video resolution of the incoming video signal (e.g., video signal 210, as shown in FIG. 2) and the video resolution utilized by external rendering device 204. This advantageously causes content item 208 to not appear skewed or distorted. As also described below, the third dimension value and the fourth dimension value may be utilized to determine a coordinate at which the scaled version of content item 208 is to be displayed with respect to the display region. In particular, content item 208 is positioned such that it appears over the display region. This advantageously provides a seamless experience in which it appears that content item 208 is rendered within the display region of the application window (and rendered by computing device 202), even though content item 208 is rendered over the display region (and rendered by external rendering device 204).

In step 406, the content is retrieved based on the network address. For example, with reference to FIG. 2, graphical representation analyzer 232 generates a request 238 for content item 208, which is provided to a server (e.g., server 220) at which content item 208 is located. Request 238 is provided to network interface 236, which provides request 238 to server 220 via network 216.

In step 408, the content is rendered over the display region of the application window in accordance with the characteristics determined for the display region of the application window and the characteristics determined for the graphical representation. The resulting video signal (e.g., video signal 222) is provided to display device 206 for display thereby via video output interface 234. For example, with reference to FIG. 2, graphical representation analyzer 232 renders content item 208 over the display region of the application window. For instance, as shown in FIG. 3B, content item 308 is displayed over display region 302 of application window 300.

By having external rendering device 204 retrieve and render content item 208 (as opposed to computing device 202), the embodiments described herein advantageously prevent secured content items (e.g., content item 208) from being rendered and displayed when rendering device 204 is not coupled to computing device 202, as the secure content item is not provided to computing device 202 for rendering thereby. Instead, the rendering of the secure content item is performed outside of the traditional graphic pipeline; in particular, the rendering is performed by external rendering device 204 coupled between computing device 202 and display device 206. Accordingly, the techniques described herein prevent access to secured content items, such as personal and/or confidential information, unless external rendering device 204 is utilized.

Figure 5:
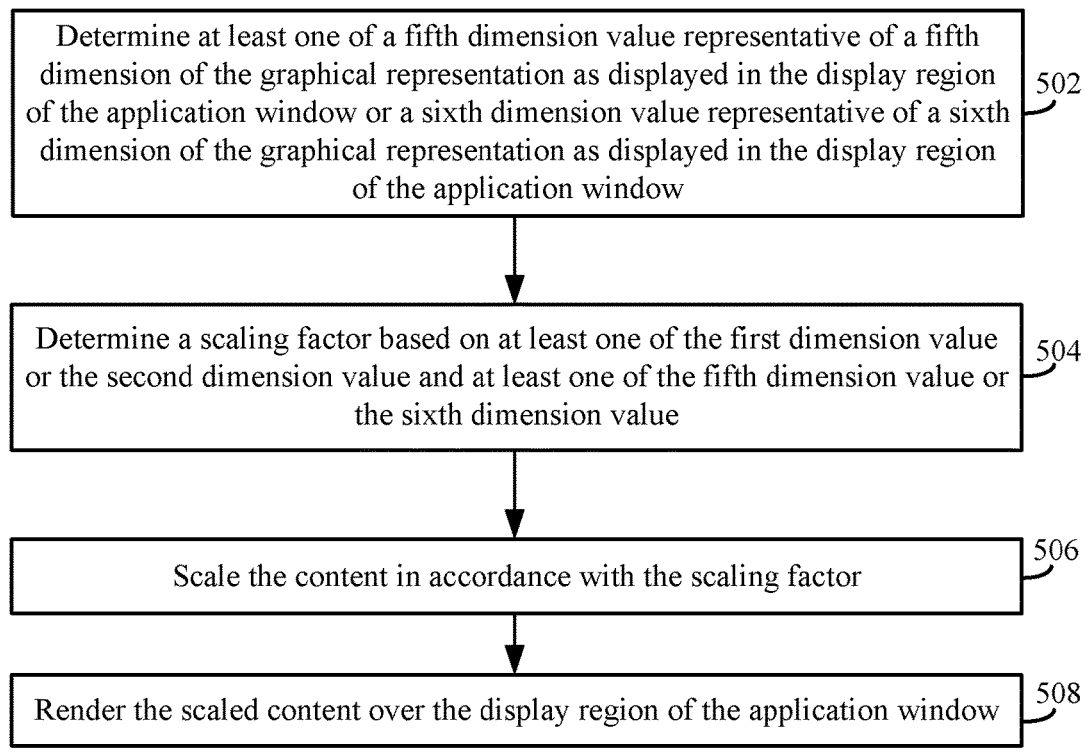
FIG. 5 shows a flowchart for scaling content in accordance with an example embodiment.
Figure 6:
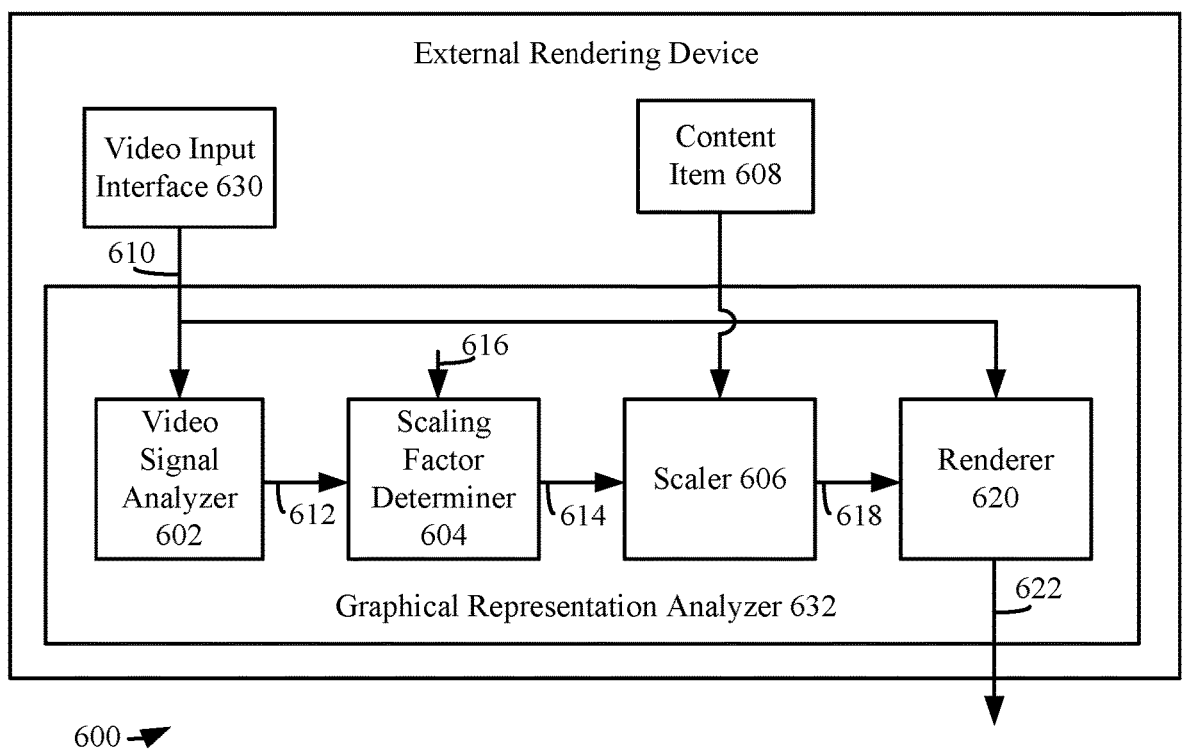
FIG. 6 depicts a block diagram of an external rendering device in accordance with an example embodiment.

In accordance with one or more embodiments, the content is scaled before being rendered over the display region of the application window. FIG. 5 shows a flowchart 500 for scaling content in accordance with an example embodiment. In an embodiment, flowchart 500 may be implemented by an external rendering device 600 shown in FIG. 6. However, it is noted that the method is not limited to that implementation. FIG. 6 depicts a block diagram of external rendering device 600 in accordance with an example embodiment. External rendering device 600 is an example of external rendering device 204, as described above with reference to FIG. 2. As shown in FIG. 6, external rendering device 600 may comprise a graphical representation analyzer 632, a video input interface 630 and a content item 608. Graphical representation analyzer 632, video input interface 630, and content item 608 are respective examples of comprise graphical representation analyzer 232, video input interface 230, and content 208, as described above with reference to FIG. 2. It is noted that external rendering device 600 may comprise other components (as described above with reference to FIG. 2) that are not shown in FIG. 6 for the sake of brevity. Other structural and operational embodiments will be apparent to persons skilled in the relevant art(s) based on the discussion regarding flowchart 500 and external rendering device 600 of FIG. 6.

Flowchart 500 begins at step 502. In step 502, at least one of a fifth dimension value representative of a fifth dimension of the graphical representation as displayed in the display region of the application window or a sixth dimension value representative of a sixth dimension of the graphical representation as displayed in the display region of the application window is determined. For example, with reference to FIG. 6, video signal analyzer 602 may analyze a video signal 610 received via video input interface 630 to determine a fifth dimension value representative of a fifth dimension of the graphical representation as displayed in the display region of the application window or a sixth dimension value representative of a sixth dimension of the graphical representation as displayed in the display region of the application window is determined. For example, with reference to FIG. 3A, video signal analyzer 602 may determine a fifth dimension value representative of a fifth dimension 314 (e.g., the height) of graphical representation 318 as displayed in display region 302 of application window 300 or a sixth dimension value representative of a sixth dimension 316 (e.g., the width) of graphical representation 318 as displayed in display region 302 of application window 300. Referring again to FIG. 6, the determined dimensions (shown as dimension(s) 612) are provided to scaling factor determiner 604.

In step 504, a scaling factor is determined based on at least one of the first dimension value or the second dimension value and at least one of the fifth dimension value or the sixth dimension value. For example, with reference to FIG. 6, scaling factor determined determines a scaling factor 614 based at least one the first dimension value or the second dimension value (shown as dimension(s) 616, which may be determined via step 404, as described above with reference to FIG. 4) and dimension(s) 612. In accordance with an embodiment, scaling factor determiner 604 may determine scaling factor 614 by dividing the fifth dimension value of dimension(s) 612 (e.g., the height) of the graphical representation as displayed by the display device by first dimension value of dimension(s) 614 (e.g., the height) of the graphical representation that is encoded thereby. In accordance with another embodiment, scaling factor determiner 604 may determine scaling factor 614 by dividing the sixth dimension value of dimension(s) 612 (e.g., the width) of the graphical representation as displayed by the display device by the second dimension value of dimension(s) 616 (e.g., the width) of the graphical representation that is encoded thereby. It is noted that in embodiments in which the graphical representation comprises a square shape, the respective height and width values are the same value. In such embodiments, the encoding of the graphical representation may specify a single dimension value, as both the height and width values are the same. Scaling factor 614 is provided to scaler 606.

In step 506, the content is scaled in accordance with the scaling factor. For example, with reference to FIG. 6, scaler 606 scales content item 608 in accordance with scaling factor 612. The scaled content (shown as scaled content item 618) is provided to renderer 620. As described herein, the scaling factor determined using the third dimension value, the fourth dimension value, the fifth dimension value, and the sixth dimension value is utilized to scale the dimensions (e.g., the first dimension value and the second dimension value) is utilized to scale content item 608. This advantageously causes content item 208 to not appear skewed or distorted when displayed over the display region of an application window. Additional details regarding scaling the content are described below with reference to FIGS. 7 and 8.

In step 508, the scaled content is rendered over the display region of the application window. For example, with reference to FIGS. 3B and 6, renderer 620 renders scaled content item 618 (shown as content item 308 in FIG. 3B) over display region 302 of application window 300. In accordance with an embodiment, renderer 620 renders scaled content item 618 into a frame buffer, which corresponds to the location and size of display region 302 of application window 300. The frame buffer comprises a bitmap comprising pixel values for all the pixels corresponding to scaled content item 618. Renderer 620 overlays the frame buffer comprising scaled content item 618 on top of a portion of the main frame buffer corresponding to display region 302 of application window 300. Renderer 620 renders the frame buffer comprising scaled content item 318 and outputs a video signal 622 comprising the content provided via video signal 610 and scaled content item 618. Video signal 622 is an example of video signal 222, as described above with reference to FIG. 2.

In accordance with an embodiment, graphical representation analyzer 232 may replace the pixel values of the pixels that comprise the display region of the application window with the pixel values of the pixels that comprise the scaled content item 208. Graphical representation analyzer 232 may convert the resulting bitmap to video signal 222.

Figure 7:
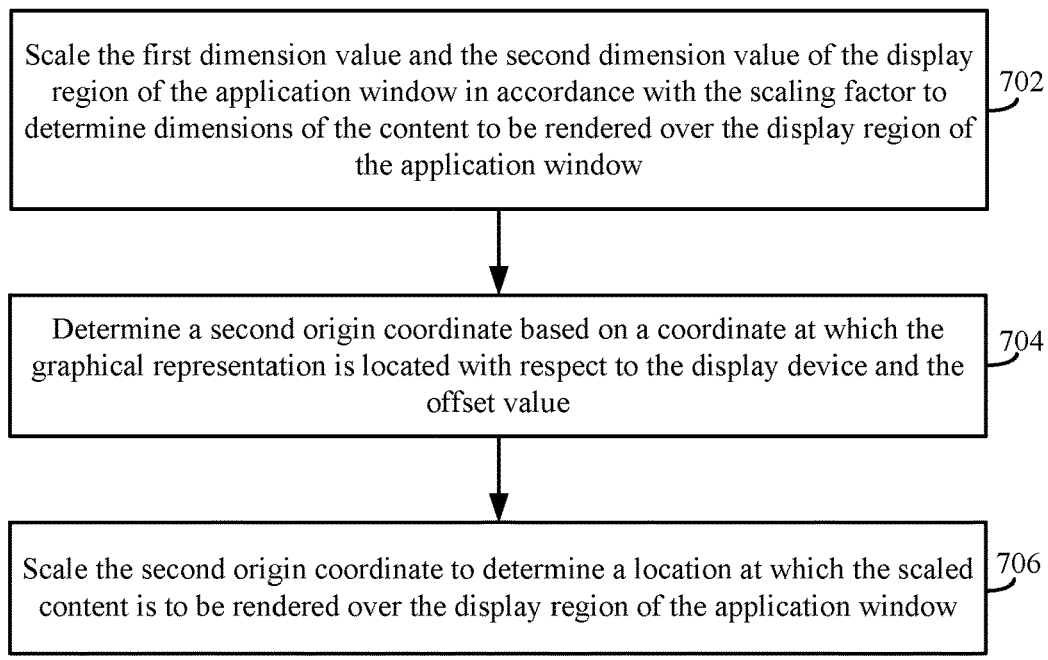
FIG. 7 shows a flowchart for determining the size of and location at which content is to be rendered in accordance with an example embodiment.
Figure 8:
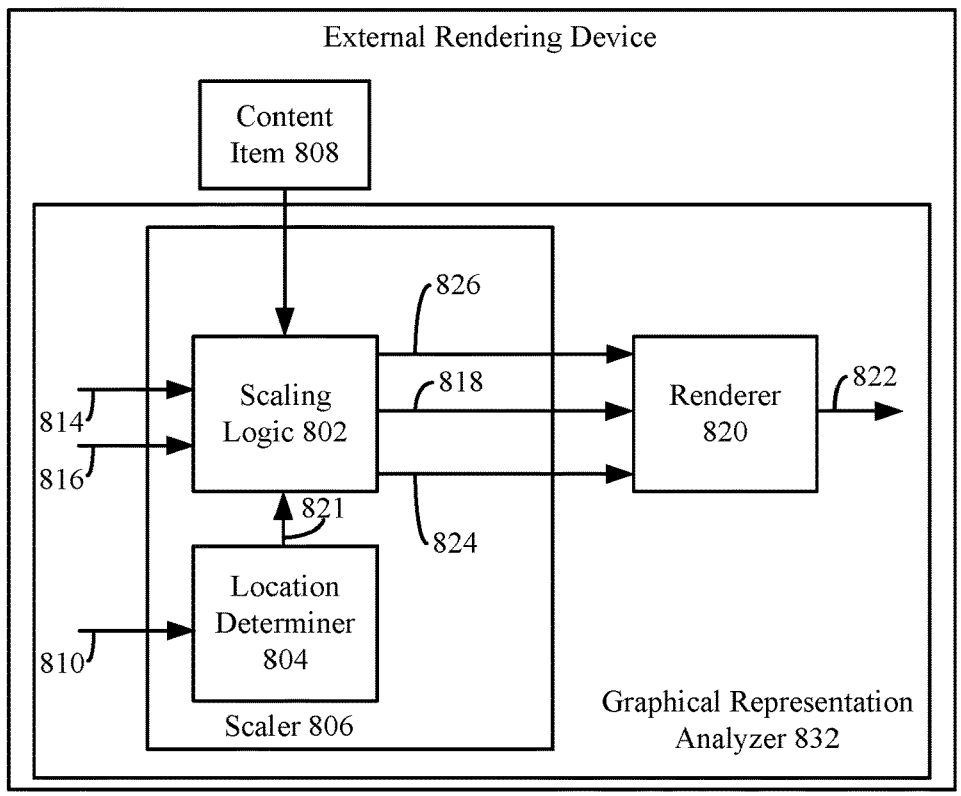
FIG. 8 depicts a block diagram of an external rendering device in accordance with an example embodiment.

FIG. 7 shows a flowchart 700 for determining the size of and location at which content is to be rendered in accordance with an example embodiment. In an embodiment, flowchart 700 may be implemented by an external rendering device 800 shown in FIG. 8. However, it is noted that the method is not limited to that implementation. FIG. 8 depicts a block diagram of external rendering device 800 in accordance with another example embodiment. External rendering device 800 is an example of external rendering device 600, as described above with reference to FIG. 6. As shown in FIG. 8, external rendering device 800 may comprise a graphical representation analyzer 832, which comprises a scaler 806, a renderer 820, and a content item 808, which are respective examples of external rendering device 600, scaler 606, renderer 620, and content item 608, as described above with reference to FIG. 6. It is noted that external rendering device 800 may comprise other components (as described above with reference to FIG. 2) that are not shown in FIG. 8 for the sake of brevity. Other structural and operational embodiments will be apparent to persons skilled in the relevant art(s) based on the discussion regarding flowchart 700 and external rendering device 800 of FIG. 8.

Flowchart 700 begins at step 702. In step 702, the first dimension value and the second dimension value of the display region of the application window are scaled in accordance with the scaling factor to determine dimensions of the content to be rendered over the display region of the application window. For example, with reference to FIG. 8, scaling logic 802 is configured to scale the first dimension value and the second dimension value (shown as dimension(s) 816, which may be determined via step 404, as described above with reference to FIG. 4) of the display region of the application window in accordance with a scaling factor 814. Dimension(s) 816 and scaling factor 814 are respective examples of dimensions(s) 616 and scaling factor 614, as described above with reference to FIG. 6. Scaling logic 802 may generate a scaled version of content item 808 (shown as scaled content item 818) and provide scaled content item 818 to renderer 820. Scaled content item 818 is an example of scaled content item 618, as described above with reference to FIG. 6. In accordance with an embodiment, scaling logic 802 scales dimension(s) 816 by multiplying each of dimension(s) 816 by scaling factor 814. The scaled dimension(s) (shown as scaled dimension(s) 826) are provided to renderer 820. The first dimension value and the second dimension value are scaled in accordance with scaling factor 614 to synchronize the video resolution of the incoming video signal (i.e., video signal 810) and the video resolution utilized by external rendering device 800 utilizing. This advantageously content item 808 to not appear skewed or distorted.

In step 704, a second origin coordinate is determined based on a coordinate at which the graphical representation is located with respect to the display device and the offset value. For example, with reference to FIGS. 3A and 8, location determiner 804 is configured to determine a second origin coordinate based on a coordinate of graphical representation 318 (e.g., the top left coordinate of graphical representation 318) with respect to the display device (e.g., with respect to the entire image displayed by the display device) and an offset value 810. Offset value 810 may be specified via the encoding of graphical representation 318 and may be determined via step 404, as described above with reference to FIG. 4. In accordance with an embodiment, location determiner 804 may determine the x coordinate of the second origin coordinate by subtracting offset value 810 from the x coordinate at which the top left corner of graphical representation 318 is located with respect to the entire image (or view) displayed by the display device and determine they coordinate of the second origin coordinate by subtracting offset value 810 from the y coordinate at which the top left corner of graphical representation 318 is located with respect to the entire image (or view displayed by the display device. The resulting value corresponds to origin coordinate 307 of display region 302 of application window 300. The second origin coordinate (shown as coordinate 821) is provided to scaling logic 802.

In step 706, the second origin coordinate is scaled to determine a location at which the scaled content is to be rendered over the display region of the application window. For example, with reference to FIG. 8, scaling logic 802 scales the x and y coordinates of the coordinate 821 based on scaling factor 816. For instance, scaling logic 802 may multiply the x coordinate and the y coordinate of coordinate 821 by scaling factor 816 to determine the corresponding x and y coordinates at which the top left of content item 808 is to be displayed. The scaled coordinate (shown as scaled coordinate 824) is provided to renderer 820. Accordingly, offset value 810 is advantageously utilized to determine a coordinate (i.e., scaled coordinate 824) at which scaled content item 818 is to be displayed with respect to the display region. In particular, scaled content item 818 is positioned such that it appears over the display region. This advantageously provides a seamless experience in which it appears that scaled content item 818 is rendered within the display region of the application window (and rendered by the computing device that provides video signal 810), even though scaled content item 818 is rendered over the display region (and rendered by external rendering device 800).

Utilizing the scaled coordinate 824 and/or scaled dimension(s) 826, renderer 820 renders scaled content item 818 into a frame buffer, which corresponds to the location and size of the display region of the application window in which scaled content item 818 is to be displayed. This frame buffer comprises a bitmap comprising pixel values for all the pixels corresponding to the scaled content item 818. Renderer 820 overlays the frame buffer comprising scaled content item 818 on top of a portion of the main frame buffer corresponding to the display region of the application window in which scaled content item 818 is to be displayed. Renderer 820 renders the frame buffer comprising scaled content item 818 and outputs a video signal 822, which is an example of video signal 622.

In accordance with an embodiment, renderer 820 may replace the pixel values of the pixels that comprise the display region of the application window with the pixel values of the pixels that comprise scaled content item 818. Renderer 820 may convert the resulting bitmap to video signal 822.

In accordance with an embodiment, secured content items are only displayed in an application window responsive to detecting a particular triggering event. In one example, the triggering event is detecting that the application window in which the secured content item is to be displayed is active; however, it is noted that other types of triggering events may be utilized. In accordance with such an embodiment, the graphical representation encoding may specify additional characteristics associated with the application window. For instance, the encoding may specify an application window identifier that uniquely identifies the application window in which the secured content item is to be displayed, a state value that indicates whether a cursor rendered by the host computing device is inside the display region of the application window, an x-axis position value that indicates the x coordinate of the cursor (e.g., in pixels) inside the display region of the application window relative to the origin coordinate, and a y-axis position value that indicates the y coordinate of the cursor (e.g., in pixels) inside the display region of the application window relative to the origin coordinate.

As described above, the graphical representation is dynamically generated by code (e.g., code 114) when the application window is resized. In accordance with the foregoing embodiment, the graphical representation is also dynamically generated by the code each time the cursor is moved to a new position within the display region of the application window, each time the cursor is placed within the display region and/or each time the cursor leaves the display region.

Utilizing the state value, the external rendering device (e.g., external rendering device 104, as shown in FIG. 1) determines whether or not the application window is in an active state. For example, if the state value indicates that a curser is inside the display region of the application window, then the external rendering device determines that the application window is in an active state (i.e., the user is utilizing and/or viewing the content of application window). Otherwise, the external rendering device determines that the application window is not in an active state. Responsive to determining that the application window is active, the external rendering device renders the secured content into the window identified by the application window identifier. When a user subsequently moves the curser such that it is no longer in the display region of the application window, the encoding of the graphical representation is updated to indicate as such, and the external rendering device no longer renders the secured content item (and instead, reverts to causing the graphical representation of the content item to be displayed). It is further noted that the external rendering device no longer renders the secured content item responsive to determining that the graphical representation thereof is no longer displayed, e.g., when the application window in which the graphical representation is minimized or obfuscated (e.g., covered) by another application window.

Because the secured content item is rendered over the display region by the graphical representation analyzer 232, the cursor generated by the operating system executing on the host computing device is no longer displayed. This causes a disruption in the user's ability to interact with the secured content item. To overcome this issue, the external rendering device may render a cursor located at the cursor's x and y coordinates, as specified by the encoding in the graphical representation of the content item.

Figure 9:
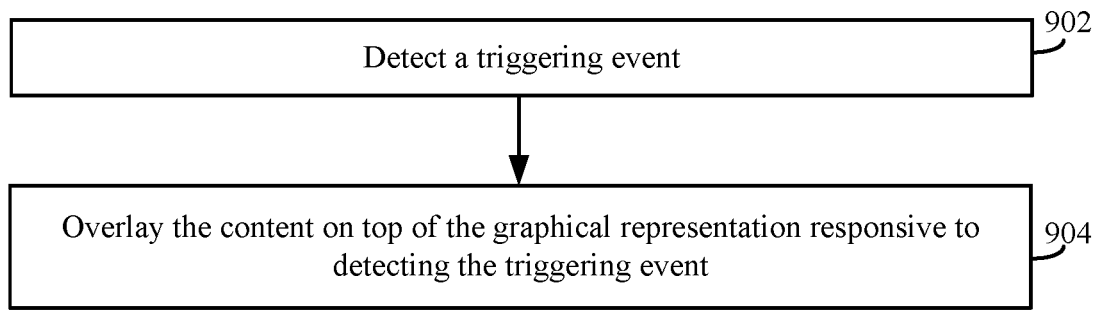
FIG. 9 shows a flowchart for displaying a secured content item responsive to detecting a triggering event in accordance with an example embodiment.
Figure 10:
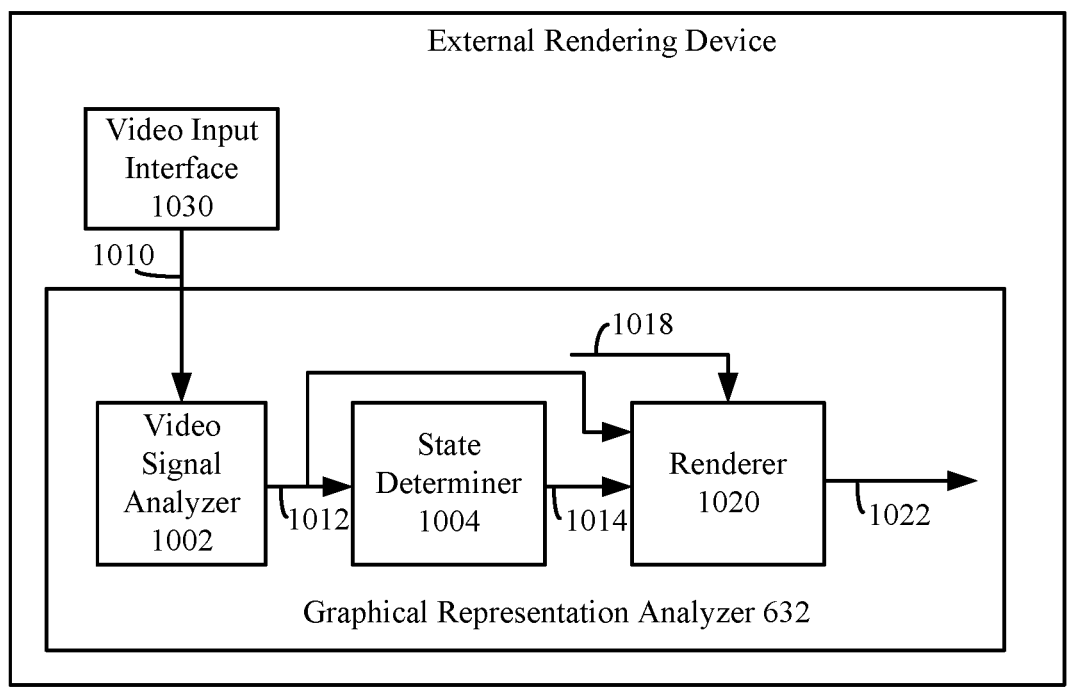
FIG. 10 depicts a block diagram of an external rendering device in accordance with a further example embodiment.

Accordingly, secured content items are only displayed in an application window responsive to detecting a particular triggering event in many ways. For instance, FIG. 9 shows a flowchart 900 for displaying a secured content item responsive to detecting a triggering event in accordance with an example embodiment. In an embodiment, flowchart 900 may be implemented by an external rendering device 1000 shown in FIG. 10, However, it is noted that the method is not limited to that implementation. FIG. 10 depicts a block diagram of external rendering device 1000 in accordance with a further example embodiment. External rendering device 1000 is an example of external rendering device 800, as described above with reference to FIG. 8. As shown in FIG. 10, external rendering device 1000 may comprise a graphical representation analyzer 1032, a video input interface 1030, a state determiner 1004, and a renderer 1020. External rendering device 1000, graphical representation analyzer 1032, video input interface 1030, and renderer 1020 are respective examples of comprise external rendering device 600 and 800, graphical representation analyzer 632 and 832, video input interface 630, and renderer 620 and 820, as described above with reference to FIGS. 6 and 8. It is noted that external rendering device 1000 may comprise other components (as described above with reference to FIG. 2) that are not shown in FIG. 6 for the sake of brevity. Other structural and operational embodiments will be apparent to persons skilled in the relevant art(s) based on the discussion regarding flowchart 900 and external rendering device 1000 of FIG. 10.

Flowchart 900 begins at step 902. In step 902, a triggering event is detected. For example, with reference to FIG. 10, state determiner 1004 detects the triggering event.

In accordance with one or more embodiments, the triggering event comprises detecting a cursor rendered by the computing device is placed within the display region of the application window. For example, with reference to FIG. 10, video signal analyzer 1002 may analyze an encoding of a graphical representation of a secured content item included in video signal 1010 received via video input interface 1030 to determine an application window identifier that uniquely identifies the application window in which the secured content item, the state value, the x-axis position value, and the y-axis position value. Such data (shown as data 1012) is provided to state determiner 1004. State determiner 1004 is configured to determine whether the application window identified by the application window identifier is in an active state by analyzing state value. If the state value indicates that a cursor is included in the display region of the application window, then state determiner 1004 determines that the application window is active. In response to determining that the cursor is included in the display region, state determiner 1004 may output an indication 1014 that indicates as such. If the state value indicates that a cursor is not included in the display region of the application window, then state determiner 1004 determines that the application window is inactive. In response to determining that the cursor is included in the display region, state determiner 1004 may output an indication that indicates as such.

In step 904, the content is overlayed on top of the graphical representation responsive to detecting the triggering event. For example, with reference to FIG. 10, renderer 1020, responsive to receiving indication 1014, renderer 1020 generates a video signal 1022 that comprises scaled content item 1018, which is overlayed on top of the graphical representation. Scaled content item 1018 is an example of scaled content item 818, as described above with reference to FIG. 8.

In accordance with an embodiment, renderer 1020 is further configured to render a cursor in place of the cursor rendered by the host computing device. For instance, renderer 1020 may render the cursor at the x and y coordinates specified by the encoding in the graphical representation of the content item. In accordance with such an embodiment, data 1012 (or portions thereof, such as the x and y coordinates determined from the encoding) may be provided to renderer 1020. Renderer 1020 utilizes these coordinates to determine a location at which the cursor should be rendered. The coordinates may be scaled (e.g., by scaler 606, as shown in FIG. 6) utilizing a scaling factor (e.g., scaling factor 614, as shown in FIG. 6), and the scaled coordinates may be utilized as the location at which the cursor is to be rendered.

Figure 11A:
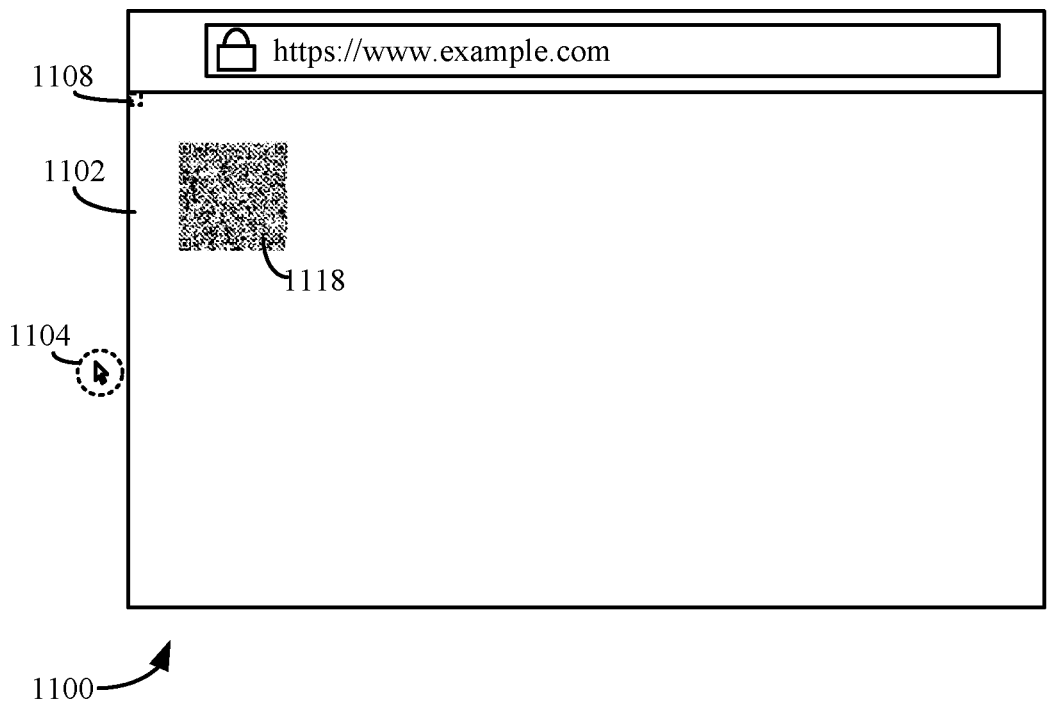
FIGS. 11A-11C show example application windows in accordance with additional example embodiments.

The foregoing techniques is described with reference to FIGS. 11A-11C. For example, FIG. 11A depicts an example application window 1100 in accordance with an example embodiment. Application window 1100 is an example of application window 300, as described above with reference to FIG. 3A.

As shown in FIG. 11A, application window 1100 comprises a display region 1102, which is an example of display region 302, as shown in FIG. 3A. As further shown in FIG. 11A, a graphical representation 1118 is rendered and displayed in display region 1102 of application window 1100. Graphical representation 1118 is an example of graphical representation 318, as described above with reference to FIG. 3A. Graphical representation 1118 utilizes an encoding to specify an application window identifier that uniquely identifies application window 1100 in which secured the content item is to be displayed, a state value that indicates whether a cursor 1104 rendered by the host computing device is inside display region 1102 of application window 1100, an x-axis position value that indicates the x coordinate of cursor 1104 (e.g., in pixels) inside display region of the application window relative to its origin coordinate 1107 (which is an example of origin coordinate 307), and a y-axis position value that indicates the y coordinate of cursor 1104 (e.g., in pixels) inside display region 1102 of application window 1100 relative to its origin coordinate 1107.

As shown in FIG. 11A, cursor 1104 is located outside of display region 1102. Accordingly, the state value encoded via graphical representation 1118 indicates that the application window 1100 is inactive. Accordingly, external rendering device 1000 does not render the secured content item, and instead provides the video signal received from the host computing device to the display device coupled to external rendering device 1000, which causes graphical representation 1118 to be displayed in display region.

Figure 11B:
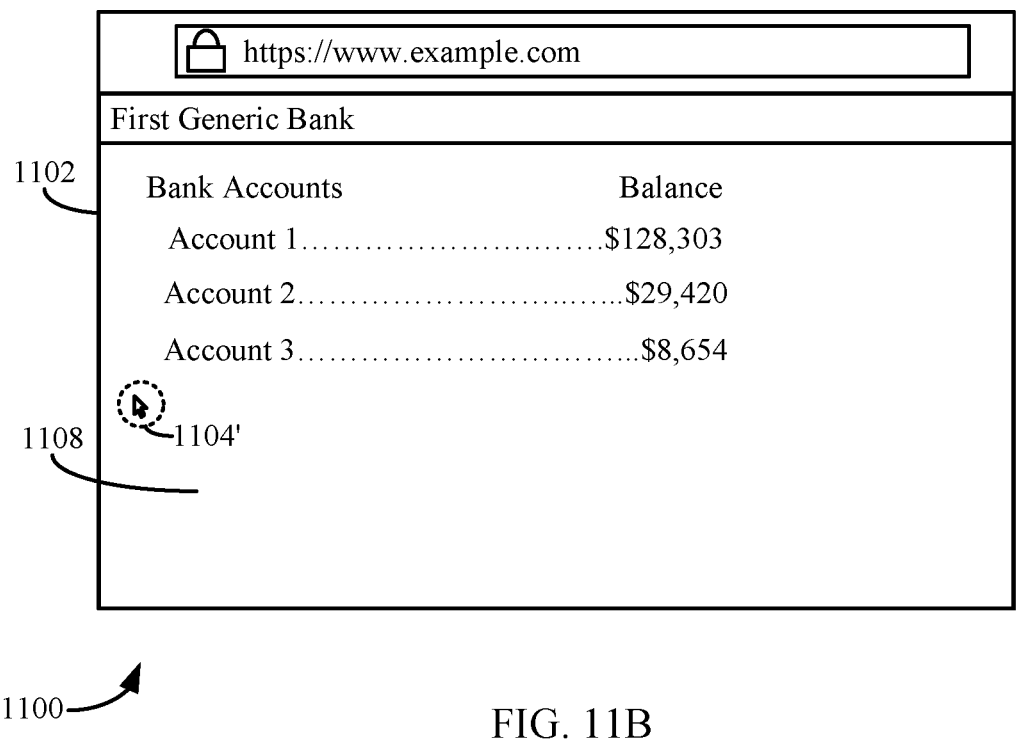

As shown in FIG. 11B, a user has moved cursor 1104 over display region 1102. As such, graphical representation 1118 is re-generated such that the state value encoded via the newly-generated graphical representation indicates that the application window 1100 is active. The encoding also specifies the x and y coordinates of cursor 1104 with respect to origin coordinate 1107. In response to detecting that application window 1100 is active, renderer 1020 causes secured content item 1108 to be displayed over display region 1102, thereby effectively covering the newly-generated graphical representation and cursor 1104. Renderer 1020 utilizes the x and y coordinates specified by the encoding of the newly-generated graphical representation 1118 to render a cursor (shown as cursor 1104') located at the x and y coordinate.

Figure 11C:
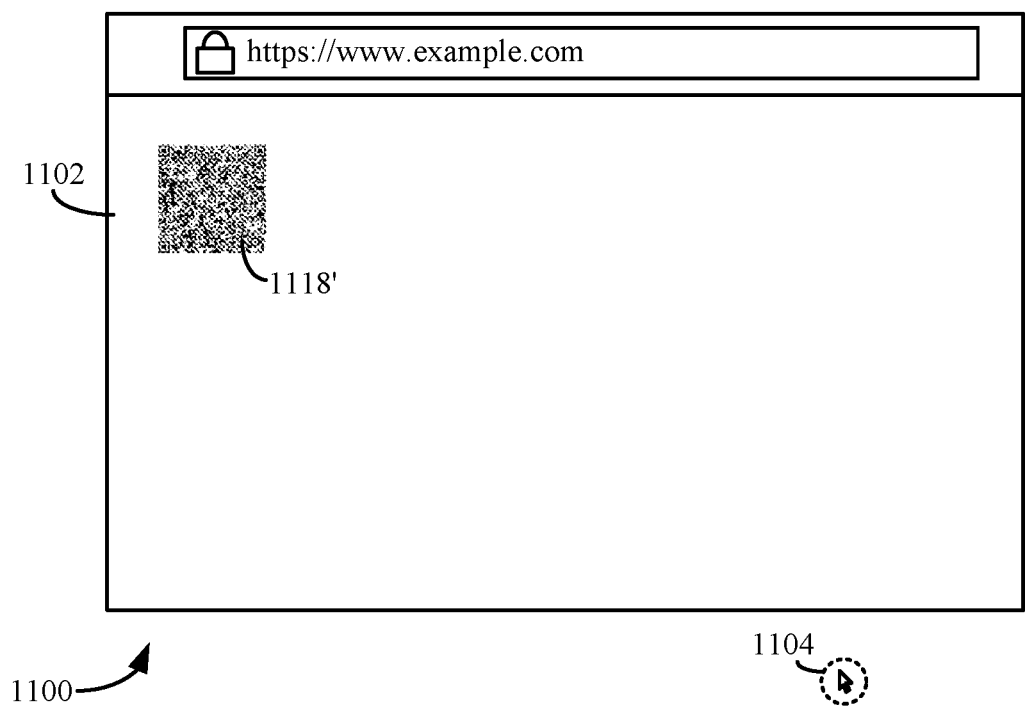

As shown in FIG. 11C, a user has moved cursor 1104 outside of display region 1102. Accordingly, graphical representation 1118 is re-generated once again such that the state value encoded via graphical representation indicates that application window 1100 is inactive. Therefore, renderer 1020 no longer renders secured content item, and the newly-generated graphical representation (shown as graphical representation 1118') is displayed in display region 1102.

III. Example Mobile Device and Computing Device Embodiments

Embodiments described herein may be implemented in hardware, or hardware combined with software and/or firmware. For example, embodiments described herein may be implemented as computer program code/instructions configured to be executed in one or more processors and stored in a computer readable storage medium. Alternatively, embodiments described herein may be implemented as hardware logic/electrical circuitry.

As noted herein, the embodiments described, including computing device 102, server 120, external rendering device 104, and/or display device 106 of FIG. 1, computing device 202, server 220, external rendering device 204, and/or display device 206 of FIG. 2, external rendering device 600 of FIG. 6, external rendering device 800 of FIG. 8 and external rendering device 1000 of FIG. 10, along with any components and/or subcomponents thereof, as well as the flowcharts/flow diagrams described herein, including portions thereof, and/or further examples described herein, may be implemented in hardware, or hardware with any combination of software and/or firmware, including being implemented as computer program code configured to be executed in one or more processors and stored in a computer readable storage medium, or being implemented as hardware logic/electrical circuitry, such as being implemented together in a system-on-chip (SoC), a field programmable gate array (FPGA), or an application specific integrated circuit (ASIC). A SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Embodiments described herein may be implemented in one or more computing devices similar to a mobile system and/or a computing device in stationary or mobile computer embodiments, including one or more features of mobile systems and/or computing devices described herein, as well as alternative features. The descriptions of mobile systems and computing devices provided herein are provided for purposes of illustration, and are not intended to be limiting. Embodiments may be implemented in further types of computer systems, as would be known to persons skilled in the relevant art(s).

Figure 12:
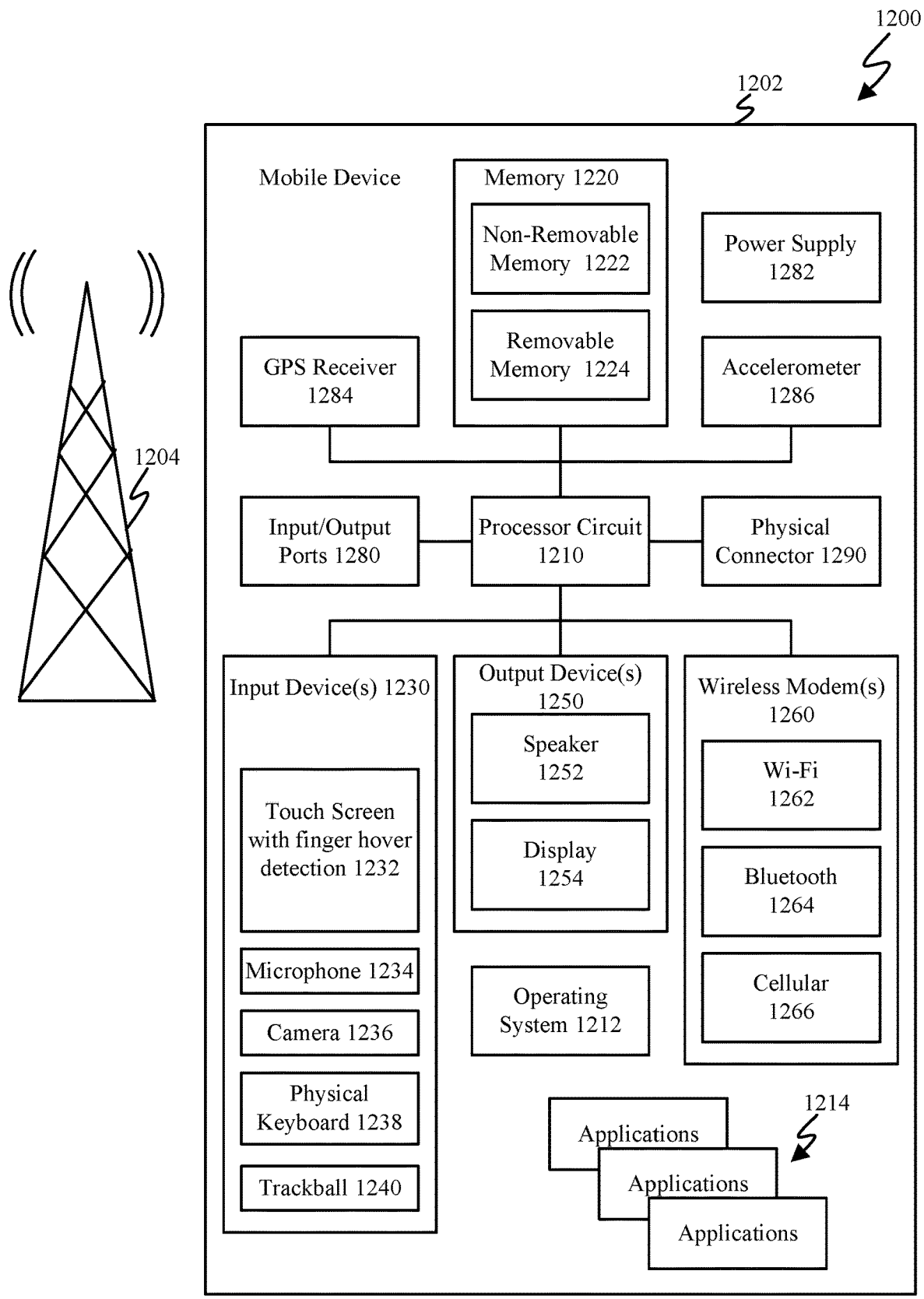
FIGS. 12 and 13 show block diagrams of example computing devices that may be used to implement embodiments.

FIG. 12 is a block diagram of an exemplary mobile system 1200 that includes a mobile device 1202 that may implement embodiments described herein. For example, mobile device 1202 may be used to implement any system, client, or device, or components/subcomponents thereof, in the preceding sections. As shown in FIG. 12, mobile device 1202 includes a variety of optional hardware and software components. Any component in mobile device 1202 can communicate with any other component, although not all connections are shown for ease of illustration. Mobile device 1202 can be any of a variety of computing devices (e.g., cell phone, smart phone, handheld computer, Personal Digital Assistant (PDA), etc.) and can allow wireless two-way communications with one or more mobile communications networks 1204, such as a cellular or satellite network, or with a local area or wide area network.

Mobile device 1202 can include a controller or processor 1210 (e.g., signal processor, microprocessor, ASIC, or other control and processing logic circuitry) for performing such tasks as signal coding, data processing, input/output processing, power control, and/or other functions. An operating system 1212 can control the allocation and usage of the components of mobile device 1202 and provide support for one or more application programs 1214 (also referred to as "applications" or "apps"). Application programs 1214 may include common mobile computing applications (e.g., e-mail applications, calendars, contact managers, web browsers, messaging applications) and any other computing applications (e.g., word processing applications, mapping applications, media player applications).

Mobile device 1202 can include memory 1220. Memory 1220 can include non-removable memory 1222 and/or removable memory 1224. Non-removable memory 1222 can include RAM, ROM, flash memory, a hard disk, or other well-known memory devices or technologies. Removable memory 1224 can include flash memory or a Subscriber Identity Module (SIM) card, which is well known in GSM communication systems, or other well-known memory devices or technologies, such as "smart cards." Memory 1220 can be used for storing data and/or code for running operating system 1212 and application programs 1214. Example data can include web pages, text, images, sound files, video data, or other data to be sent to and/or received from one or more network servers or other devices via one or more wired or wireless networks. Memory 1220 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

A number of programs may be stored in memory 1220. These programs include operating system 1212, one or more application programs 1214, and other program modules and program data. Examples of such application programs or program modules may include, for example, computer program logic (e.g., computer program code or instructions) for implementing one or more of code 114 of FIG. 1, code 214 and graphical representation analyzer 232 of FIG. 2, graphical representation analyzer 632 of FIG. 6 of FIG. 6, and graphical representation analyzer 832 of FIG. 8, along with any components and/or subcomponents thereof, as well as the flowcharts/flow diagrams described herein, including portions thereof, and/or further examples described herein.

Mobile device 1202 can support one or more input devices 1230, such as a touch screen 1232, a microphone 1234, a camera 1236, a physical keyboard 1238 and/or a trackball 1240 and one or more output devices 1250, such as a speaker 1252 and a display 1254. Other possible output devices (not shown) can include piezoelectric or other haptic output devices. Some devices can serve more than one input/output function. For example, touch screen 1232 and display 1254 can be combined in a single input/output device. Input devices 1230 can include a Natural User Interface (NUI).

One or more wireless modems 1260 can be coupled to antenna(s) (not shown) and can support two-way communications between processor 1210 and external devices, as is well understood in the art. Modem 1260 is shown generically and can include a cellular modem 1266 for communicating with the mobile communication network 1204 and/or other radio-based modems (e.g., Bluetooth 1264 and/or Wi-Fi 1262). At least one wireless modem 1260 is typically configured for communication with one or more cellular networks, such as a GSM network for data and voice communications within a single cellular network, between cellular networks, or between the mobile device and a public switched telephone network (PSTN).

Mobile device 1202 can further include at least one input/output port 1280, a power supply 1282, a satellite navigation system receiver 1284, such as a Global Positioning System (GPS) receiver, an accelerometer 1286, and/or a physical connector 1290, which can be a USB port, IEEE 1394 (FireWire) port, and/or RS-232 port. The illustrated components of mobile device 1202 are not required or all-inclusive, as any components can be deleted and other components can be added as would be recognized by one skilled in the art.

In an embodiment, mobile device 1202 is configured to implement any of the above-described features of flowcharts herein. Computer program logic for performing any of the operations, steps, and/or functions described herein may be stored in memory 1220 and executed by processor 1210.

Figure 13:
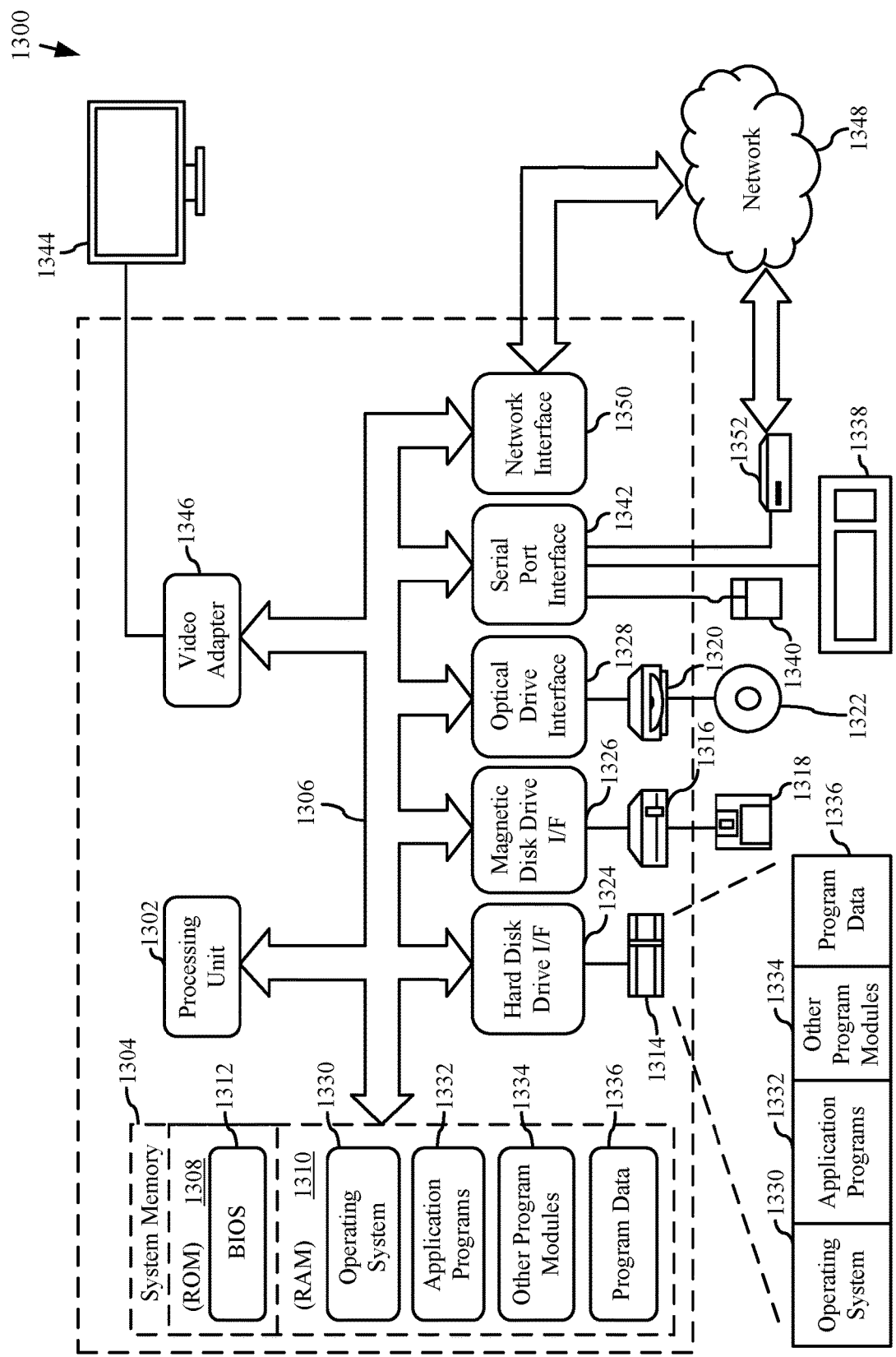

FIG. 13 depicts an exemplary implementation of a computing device 1300 in which embodiments may be implemented. For example, embodiments described herein may be implemented in one or more computing devices similar to computing device 1300 in stationary or mobile computer embodiments, including one or more features of computing device 1300 and/or alternative features. The description of computing device 1300 provided herein is provided for purposes of illustration, and is not intended to be limiting. Embodiments may be implemented in further types of computer systems and/or game consoles, etc., as would be known to persons skilled in the relevant art(s).

As shown in FIG. 13, computing device 1300 includes one or more processors, referred to as processor circuit 1302, a system memory 1304, and a bus 1306 that couples various system components including system memory 1304 to processor circuit 1302. Processor circuit 1302 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 1302 may execute program code stored in a computer readable medium, such as program code of operating system 1330, application programs 1332, other programs 1334, etc. Bus 1306 represents one or more of any of several types of bus structures, including a memory bus or memory controller, a peripheral bus, an accelerated graphics port, and a processor or local bus using any of a variety of bus architectures. System memory 1304 includes read only memory (ROM) 1308 and random access memory (RAM) 1310. A basic input/output system 1312 (BIOS) is stored in ROM 1308.

Computing device 1300 also has one or more of the following drives: a hard disk drive 1314 for reading from and writing to a hard disk, a magnetic disk drive 1316 for reading from or writing to a removable magnetic disk 1318, and an optical disk drive 1320 for reading from or writing to a removable optical disk 1322 such as a CD ROM, DVD ROM, or other optical media. Hard disk drive 1314, magnetic disk drive 1316, and optical disk drive 1320 are connected to bus 1306 by a hard disk drive interface 1324, a magnetic disk drive interface 1326, and an optical drive interface 1328, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 1330, one or more application programs 1332, other programs 1334, and program data 1336. Application programs 1332 or other programs 1334 may include, for example, computer program logic (e.g., computer program code or instructions) for implementing embodiments described herein, such as one or more of code 114 of FIG. 1, code 214 and graphical representation analyzer 232 of FIG. 2, graphical representation analyzer 632 of FIG. 6 of FIG. 6, and graphical representation analyzer 832 of FIG. 8, along with any components and/or subcomponents thereof, as well as the flowcharts/flow diagrams described herein, including portions thereof, and/or further examples described herein.

A user may enter commands and information into the computing device 1300 through input devices such as keyboard 1338 and pointing device 1340. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 1302 through a serial port interface 1342 that is coupled to bus 1306, but may be connected by other interfaces, such as a parallel port, game port, or a universal serial bus (USB).

A display screen 1344 is also connected to bus 1306 via an interface, such as a video adapter 1346. Display screen 1344 may be external to, or incorporated in computing device 1300. Display screen 1344 may display information, as well as being a user interface for receiving user commands and/or other information (e.g., by touch, finger gestures, virtual keyboard, etc.). In addition to display screen 1344, computing device 1300 may include other peripheral output devices (not shown) such as speakers and printers.

Computing device 1300 is connected to a network 1348 (e.g., the Internet) through an adaptor or network interface 1350, a modem 1352, or other means for establishing communications over the network. Modem 1352, which may be internal or external, may be connected to bus 1306 via serial port interface 1342, as shown in FIG. 13, or may be connected to bus 1306 using another interface type, including a parallel interface.

As used herein, the terms "computer program medium," "computer-readable medium," and "computer-readable storage medium," etc., are used to refer to physical hardware media. Examples of such physical hardware media include the hard disk associated with hard disk drive 1314, removable magnetic disk 1318, removable optical disk 1322, other physical hardware media such as RAMs, ROMs, flash memory cards, digital video disks, zip disks, MEMs, nanotechnology-based storage devices, and further types of physical/tangible hardware storage media (including memory 1320 of FIG. 13). Such computer-readable media and/or storage media are distinguished from and non-overlapping with communication media and propagating signals (do not include communication media and propagating signals). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 1332 and other programs 1334) may be stored on the hard disk, magnetic disk, optical disk, ROM, RAM, or other hardware storage medium. Such computer programs may also be received via network interface 1350, serial port interface 1342, or any other interface type. Such computer programs, when executed or loaded by an application, enable computing device 1300 to implement features of embodiments discussed herein. Accordingly, such computer programs represent controllers of the computing device 1300.

Embodiments are also directed to computer program products comprising computer code or instructions stored on any computer-readable medium or computer-readable storage medium. Such computer program products include hard disk drives, optical disk drives, memory device packages, portable memory sticks, memory cards, and other types of physical storage hardware.

IV. Further Example Embodiments

An apparatus configured to be externally coupled to a computing device. The apparatus comprises: at least one processor circuit; and at least one memory that stores program code configured to be executed by the at least one processor circuit, the program code comprising: a graphical representation analyzer configured to: receive, from the computing device, a video signal comprising a graphical representation of content to be rendered in a display region of an application window displayed via a display device coupled to the apparatus; analyze the graphical representation to determine characteristics of the display region of the application window, characteristics of the graphical representation, and a network address at which the content is located; retrieve the content based on the network address; and render the content over the display region of the application window in accordance with the characteristics determined for the display region of the application window and the characteristics determined for the graphical representation.

In an embodiment of the apparatus, the apparatus comprises a docking station.

In an embodiment of the apparatus, the graphical representation is a quick response (QR) code.

In an embodiment of the apparatus, the characteristics of the display region of the application window comprise at least one of: a first dimension value representative of a first dimension of the display region of the application window; or a second dimension value representative of a second dimension of the display region of the application window; and wherein the characteristics of the graphical representation comprise at least one of: an offset value representative of an offset of the graphical representation from a first origin coordinate of the display region of the application window; a third dimension value representative of a third dimension of the graphical representation; or a fourth dimension value representative of a fourth of the graphical representation.

In an embodiment of the apparatus, the apparatus is further configured to: determine at least one of a fifth dimension value representative of a fifth dimension of the graphical representation as displayed in the display region of the application window or a sixth dimension value representative of a sixth dimension of the graphical representation as displayed in the display region of the application window; determine a scaling factor based on at least one of the first dimension value or the second dimension value and at least one of the fifth dimension value or the sixth dimension value; scale the content in accordance with the scaling factor; and render the scaled content over the display region of the application window.

In an embodiment of the apparatus, the apparatus is further configured to: scale the first dimension value and the second dimension value of the display region of the application window in accordance with the scaling factor to determine dimensions of the content to be rendered over the display region of the application window; determine a second origin coordinate based on a coordinate at which the graphical representation is located with respect to the display device and the offset value; and scale the second origin coordinate to determine a location at which the scaled content is to be rendered over the display region of the application window.

In an embodiment of the apparatus, the apparatus is further configured to: detect a triggering event; and overlay the content on top of the graphical representation responsive to detecting the triggering event.

In an embodiment of the apparatus, the apparatus is further configured to: detect a cursor rendered by the computing device is placed within the display region of the application window.

A method performed by a device configured to be externally coupled to a computing device is also described herein. The method includes: receiving, from the computing device, a video signal comprising a graphical representation of content to be rendered in a display region of an application window displayed via a display device coupled to the device configured to be externally coupled to the computing device; analyzing the graphical representation to determine characteristics of the display region of the application window, characteristics of the graphical representation, and a network address at which the content is located; retrieving the content based on the network address; and rendering the content over the display region of the application window in accordance with the characteristics determined for the display region of the application window and the characteristics determined for the graphical representation.

In an embodiment of the foregoing method, the device configured to be externally coupled to the computing device comprises a docking station.

In an embodiment of the foregoing method, the device configured to be externally coupled to the computing device is incorporated into the display device.

In an embodiment of the foregoing method, the graphical representation is a quick response (QR) code.

In an embodiment of the foregoing method, the characteristics of the display region of the application window comprise at least one of: a first dimension value representative of a first dimension of the display region of the application window; or a second dimension value representative of a second dimension of the display region of the application window; and wherein the characteristics of the graphical representation comprise at least one of: an offset value representative of an offset of the graphical representation from a first origin coordinate of the display region of the application window; a third dimension value representative of a third dimension of the graphical representation; or a fourth dimension value representative of a fourth of the graphical representation.

In an embodiment of the foregoing method, rendering the content comprises: determining at least one of a fifth dimension value representative of a fifth dimension of the graphical representation as displayed in the display region of the application window or a sixth dimension value representative of a sixth dimension of the graphical representation as displayed in the display region of the application window; determining a scaling factor based on at least one of the first dimension value or the second dimension value and at least one of the fifth dimension value or the sixth dimension value; scaling the content in accordance with the scaling factor; and rendering the scaled content over the display region of the application window.

In an embodiment of the foregoing method, scaling the content comprises: scaling the first dimension value and the second dimension value of the display region of the application window in accordance with the scaling factor to determine dimensions of the content to be rendered over the display region of the application window; determining a second origin coordinate based on a coordinate at which the graphical representation is located with respect to the display device and the offset value; and scaling the second origin coordinate to determine a location at which the scaled content is to be rendered over the display region of the application window.

In an embodiment of the foregoing method, rendering the content comprises: detecting a triggering event; and overlaying the content on top of the graphical representation responsive to detecting the triggering event.

In an embodiment of the foregoing method, the triggering event comprises: detecting a cursor rendered by the computing device is placed within the display region of the application window.

A computer-readable storage medium having program instructions recorded thereon that, when executed by at least one processor of a device configured to be externally coupled to a computing device, perform a method. The method includes: receiving, from the computing device, a video signal comprising a graphical representation of content to be rendered in a display region of an application window displayed via a display device coupled to the device configured to be externally coupled to the computing device; analyzing the graphical representation to determine characteristics of the display region of the application window, characteristics of the graphical representation, and a network address at which the content is located; retrieving the content based on the network address; and rendering the content over the display region of the application window in accordance with the characteristics determined for the display region of the application window and the characteristics determined for the graphical representation.

In an embodiment of the foregoing computer-readable storage medium, the graphical representation is a quick response (QR) code.

In an embodiment of the foregoing computer-readable storage medium, the characteristics of the display region of the application window comprise at least one of: a first dimension value representative of a first dimension of the display region of the application window; or a second dimension value representative of a second dimension of the display region of the application window; and wherein the characteristics of the graphical representation comprise at least one of: an offset value representative of an offset of the graphical representation from a first origin coordinate of the display region of the application window; a third dimension value representative of a third dimension of the graphical representation; or a fourth dimension value representative of a fourth of the graphical representation.

V. Conclusion

While various embodiments of the disclosed subject matter have been described above, it should be understood that they have been presented by way of example only, and not limitation. It will be understood by those skilled in the relevant art(s) that various changes in form and details may be made therein without departing from the spirit and scope of the embodiments as defined in the appended claims. Accordingly, the breadth and scope of the disclosed subject matter should not be limited by any of the above-described exemplary embodiments, but should be defined only in accordance with the following claims and their equivalents.

What is claimed is:

1. An apparatus configured to be externally coupled to a computing device, comprising:
   at least one processor circuit; and
   at least one memory that stores program code configured to be executed by the at least one processor circuit, the program code comprising:
      a graphical representation analyzer configured to:
         receive, from the computing device, a video signal comprising a graphical representation rather than a content item, the content item to be rendered via a display device coupled to the apparatus;
         analyze an encoding of the graphical representation to determine characteristics specified in the encoding, the specified characteristics including characteristics of a display region of the application window, display characteristics of the graphical representation, and a network address at which the content item is located;
         retrieve the content item based on the network address; and
         render the content item over the display region of the application window in accordance with the characteristics determined for the display region of the application window and the display characteristics determined for the graphical representation.

2. The apparatus of claim 1, wherein the apparatus comprises a docking station.

3. The apparatus of claim 1, wherein the graphical representation is a quick response (QR) code.

4. The apparatus of claim 1, wherein the characteristics of the display region of the application window comprise at least one of:
   a first dimension value representative of a first dimension of the display region of the application window; or
   a second dimension value representative of a second dimension of the display region of the application window; and
   wherein the display characteristics of the graphical representation comprise at least one of
   an offset value representative of an offset of the graphical representation from a first origin coordinate of the display region of the application window;
   a third dimension value representative of a third dimension of the graphical representation; or
   a fourth dimension value representative of a fourth of the graphical representation.

5. The apparatus of claim 4, wherein the apparatus is further configured to:
   determine at least one of a fifth dimension value representative of a fifth dimension of the graphical representation as displayed in the display region of the application window or a sixth dimension value representative of a sixth dimension of the graphical representation as displayed in the display region of the application window;
   determine a scaling factor based on at least one of the first dimension value or the second dimension value and at least one of the fifth dimension value or the sixth dimension value;
   scale the content item in accordance with the scaling factor; and
   render the scaled content item over the display region of the application window.

6. The apparatus of claim 5, wherein the apparatus is further configured to:
   scale the first dimension value and the second dimension value of the display region of the application window in accordance with the scaling factor to determine dimensions of the content item to be rendered over the display region of the application window;
   determine a second origin coordinate based on a coordinate at which the graphical representation is located with respect to the display device and the offset value; and
   scale the second origin coordinate to determine a location at which the scaled content is to be rendered over the display region of the application window.

7. The apparatus of claim 1, wherein the apparatus is further configured to:
   detect a triggering event; and
   overlay the content item on top of the graphical representation responsive to detecting the triggering event.

8. The apparatus of claim 1, wherein the apparatus is further configured to:
   detect that a cursor rendered by the computing device is placed within the display region of the application window.

9. A method performed by a device configured to be externally coupled to a computing device, comprising:
   receiving, from the computing device, a video signal comprising a graphical representation rather than a content item, the content item to be rendered via a display device coupled to the device configured to be externally coupled to the computing device;
   analyzing an encoding of the graphical representation to determine characteristics specified in the encoding, the specified characteristics including characteristics of a display region of the application window, display characteristics of the graphical representation, and a network address at which the content item is located;
retrieving the content item based on the network address; and
rendering the content item over the display region of the application window in accordance with the characteristics determined for the display region of the application window and the display characteristics determined for the graphical representation.

10. The method of claim 9, wherein the device configured to be externally coupled to the computing device comprises a docking station.

11. The method of claim 9, wherein the device configured to be externally coupled to the computing device is incorporated into the display device.

12. The method of claim 9, wherein the graphical representation is a quick response (QR) code.

13. The method of claim 9, wherein the characteristics of the display region of the application window comprise at least one of:
a first dimension value representative of a first dimension of the display region of the application window; or
a second dimension value representative of a second dimension of the display region of the application window; and
wherein the display characteristics of the graphical representation comprise at least one of:
an offset value representative of an offset of the graphical representation from a first origin coordinate of the display region of the application window;
a third dimension value representative of a third dimension of the graphical representation; or
a fourth dimension value representative of a fourth of the graphical representation.

14. The method of claim 13, wherein rendering the content item comprises:
determining at least one of a fifth dimension value representative of a fifth dimension of the graphical representation as displayed in the display region of the application window or a sixth dimension value representative of a sixth dimension of the graphical representation as displayed in the display region of the application window;
determining a scaling factor based on at least one of the first dimension value or the second dimension value and at least one of the fifth dimension value or the sixth dimension value;
scaling the content item in accordance with the scaling factor; and
rendering the scaled content item over the display region of the application window.

15. The method of claim 14, wherein scaling the content item comprises:
scaling the first dimension value and the second dimension value of the display region of the application window in accordance with the scaling factor to determine dimensions of the content item to be rendered over the display region of the application window;
determining a second origin coordinate based on a coordinate at which the graphical representation is located with respect to the display device and the offset value; and scaling the second origin coordinate to determine a location at which the scaled content item is to be rendered over the display region of the application window.

16. The method of claim 9, wherein rendering the content item comprises:
detecting a triggering event; and
overlaying the content item on top of the graphical representation responsive to detecting the triggering event.

17. The method of claim 9, wherein the triggering event comprises:
detecting that a cursor rendered by the computing device is placed within the display region of the application window.

18. A computer-readable storage medium having program instructions recorded thereon that, when executed by at least one processor of a device configured to be externally coupled to a computing device, perform a method, the method comprising:
receiving, from the computing device, a video signal comprising a graphical representation rather than a content item, the content item to be rendered via a display device coupled to the device configured to be externally coupled to the computing device;
analyzing an encoding of the graphical representation to determine characteristics of the specified in the encoding, the specified characteristics including characteristics of a display region of the application window, display characteristics of the graphical representation, and a network address at which the content item is located;
retrieving the content item based on the network address; and
rendering the content item over the display region of the application window in accordance with the characteristics determined for the display region of the application window and the display characteristics determined for the graphical representation.

19. The computer-readable storage medium of claim 18, wherein the graphical representation is a quick response (QR) code.

20. The computer-readable storage medium of claim 18, wherein the characteristics of the display region of the application window comprise at least one of:
a first dimension value representative of a first dimension of the display region of the application window; or
a second dimension value representative of a second dimension of the display region of the application window; and
wherein the display characteristics of the graphical representation comprise at least one of:
an offset value representative of an offset of the graphical representation from a first origin coordinate of the display region of the application window;
a third dimension value representative of a third dimension of the graphical representation; or
a fourth dimension value representative of a fourth of the graphical representation.

* * * * *